(12) United States Patent
Takano et al.

(10) Patent No.: US 10,766,142 B2
(45) Date of Patent: Sep. 8, 2020

(54) ELECTRONIC DEVICE MANUFACTURING APPARATUS AND ELECTRONIC DEVICE MANUFACTURING METHOD

(71) Applicant: Panasonic Intellectual Property Management Co., Ltd., Osaka (JP)

(72) Inventors: Ken Takano, Osaka (JP); Minoru Yamamoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 50 days.

(21) Appl. No.: 15/887,283

(22) Filed: Feb. 2, 2018

(65) Prior Publication Data

US 2018/0243909 A1     Aug. 30, 2018

(30) Foreign Application Priority Data

Feb. 24, 2017   (JP) ................................. 2017-033079

(51) Int. Cl.
*B25J 9/16* (2006.01)
*B25J 9/00* (2006.01)
(Continued)

(52) U.S. Cl.
CPC ........... *B25J 9/1687* (2013.01); *B25J 9/0018* (2013.01); *B25J 9/0096* (2013.01); *B25J 9/1697* (2013.01);
(Continued)

(58) Field of Classification Search
CPC ...... B25J 9/1687; B25J 9/0018; B25J 9/0096; B25J 9/1697; B25J 13/08; B25J 15/0616; B25J 19/023
(Continued)

(56) References Cited

U.S. PATENT DOCUMENTS

2004/0266276 A1   12/2004   Hariki et al.
2005/0195409 A1    9/2005   Watanabe et al.
(Continued)

FOREIGN PATENT DOCUMENTS

CN      101842195 A      9/2010
JP      2005-011580 A    1/2005
(Continued)

OTHER PUBLICATIONS

Chinese Search Report dated Jul. 17, 2020 for the related Chinese Patent Application No. 201810147866.3.

*Primary Examiner* — Mohammad Ali
*Assistant Examiner* — Joshua T Sanders
(74) *Attorney, Agent, or Firm* — Pearne & Gordon LLP

(57) ABSTRACT

The electronic device manufacturing apparatus includes a cable holding tool, a work stage, a robot section, a first position detector, a second position detector, and a controller. The first position detector detects positions in a two-dimensional plane direction of the cable held by the cable holding tool and the connector of the electronic device held by the work stage. The second position detector detects positions in a height direction of the cable held by the cable holding tool and the connector of the electronic device held by the work stage. The controller controls the robot section based on the detection result of the first position detector and the second position detector.

20 Claims, 17 Drawing Sheets

(51) Int. Cl.
    *B25J 15/00*     (2006.01)
    *B25J 13/08*     (2006.01)
    *B25J 19/02*     (2006.01)
    *B25J 15/06*     (2006.01)

(52) U.S. Cl.
    CPC ........... *B25J 13/08* (2013.01); *B25J 15/0019* (2013.01); *B25J 15/0061* (2013.01); *B25J 15/0066* (2013.01); *B25J 15/0616* (2013.01); *B25J 19/023* (2013.01); *G05B 2219/40564* (2013.01); *Y10S 901/09* (2013.01); *Y10S 901/41* (2013.01); *Y10S 901/47* (2013.01)

(58) Field of Classification Search
    USPC ....................................................... 700/114
    See application file for complete search history.

(56) References Cited

U.S. PATENT DOCUMENTS

2010/0131235 A1\*   5/2010   Aoba ................. G01B 11/2518
                                                                                    702/153
2010/0256818 A1    10/2010   Aoba et al.

FOREIGN PATENT DOCUMENTS

| JP | 2005-251086 A | 9/2005 |
|----|---------------|--------|
| JP | 2009-107043 A | 5/2009 |

\* cited by examiner (a)

(b)

(c)

(d)

(a)

(b)

(c)

(d)

ELECTRONIC DEVICE MANUFACTURING APPARATUS AND ELECTRONIC DEVICE MANUFACTURING METHOD

BACKGROUND

1. Technical Field

The present disclosure relates to an electronic device manufacturing apparatus and an electronic device manufacturing method for installing a belt-shaped cable on a connector.

2. Description of the Related Art

In an electronic device, such as a portable terminal, a flexible cable (hereinafter, simply referred to as "cable"), such as a flexible printed circuit (FPC) that connects functional modules, such as a display device or a circuit board which configures the electronic device, to each other, is frequently used. In addition, in a manufacturing process of the electronic devices, connection work for installing an installed portion of the cable on a connector which is a connection target, is performed. The connection work is manually performed in the related art. However, since the connection work that regards the cable as a target is complicated work accompanied by fine positioning, it is difficult to improve work efficiency, and automation of the work is suggested (for example, Japanese Patent Unexamined Publication No. 2005-11580 (PTL 1)).

In the related art illustrated in PTL 1, work for connecting a connector provided in a cable with a connector to a counterpart connector provided in a member, such as a board, is performed by two robots, such as a first robot and a second robot. In other words, in a state where the cable with a connector is sandwiched and fixed by the first robot, a position and a posture are acquired by taking an image of the connector using a first camera included in the second robot. Next, based on the acquired position detection result, the connector is gripped by the second robot. In addition, while obtaining data of the position and the posture by taking an image of the connector and the counterpart connector using a second camera included in the first robot, and performing position correction based on the data, the connector is connected to the counterpart connector.

SUMMARY

An electronic device manufacturing apparatus of the disclosure of the disclosure is an apparatus for installing a belt-shaped cable on a connector that configures a part of an electronic circuit.

The electronic device manufacturing apparatus includes a cable holding tool, a work stage, a robot section, a first position detector, a second position detector, and a controller.

The cable holding tool holds the cable.

The work stage holds an electronic device including the connector.

The robot section relatively moves the cable holding tool with respect to the electronic device held by the work stage.

The first position detector detects positions in a two-dimensional plane direction of the cable held by the cable holding tool and the connector of the electronic device held by the work stage.

The second position detector detects positions in a height direction of the cable held by the cable holding tool and the connector of the electronic device held by the work stage.

The controller controls the robot section based on the detection result of the first position detector and the second position detector.

In addition, an electronic device manufacturing method of the disclosure is a method for installing a belt-shaped cable on a connector that configures a part of an electronic circuit.

The electronic device manufacturing method includes: an electronic device holding step; a cable holding step; a temporary positioning step; a first position detecting step; a second position detecting step; and a connector installing step.

The electronic device holding step is for holding an electronic device including the connector on a work stage.

The cable holding step is for holding the cable by a cable holding tool.

The temporary positioning step is for temporarily positioning the cable held by the cable holding tool with respect to the connector by moving the cable holding tool.

The first position detecting step is for detecting positions in a two-dimensional plane direction of the connector and the temporarily positioned cable.

The second position detecting step is for detecting positions in a height direction of the connector and the temporarily positioned cable.

The connector installing step is for installing the cable on the connector by moving the cable holding tool based on the detection result of the first position detecting step and the second position detecting step.

DETAILED DESCRIPTION

The size or the thickness of a connector or a cable which are used on the inside of electronic devices has decreased as the size of the electronic devices decreases. In the example of PTL 1, the structure has changed to a structure in which the connector of the cable is abolished, and the cable is connected by directly inserting a final end of the cable into a counterpart connector. In a connection method for directly inserting the final end of the cable into the counterpart connector in this manner, in a case where a position error in a height direction with the connector at the final end of the cable, for example, curvature deformation of the cable or an error of a height position of the counterpart connector, exists, it is not possible to normally insert cable into the connector, and there is a case where an operation error occurs.

In a case of handling a cable with a connector in the related art by a robot, it is possible to grip the connector having the size and rigidity by which gripping is possible by a robot hand, and thus, the cable gripping itself is relatively easy. However, in an operation for inserting the connector into the counterpart side connector, the position error in the height direction, such as the curvature deformation of the cable, does not interrupt a connection operation.

However, in a case where the cable which is the work target is a cable of an aspect in which the connector is removed as illustrated in PTL 1, the final end thereof is thin and is likely to be bent, and further, in a case where the curvature deformation in the height direction exists, it is extremely difficult to insert the cable into the counterpart connector by gripping the cable using a second robot as illustrated in PTL 1. Therefore, work for installing the cable on the connector exclusively depends on manual work.

Figure 1:
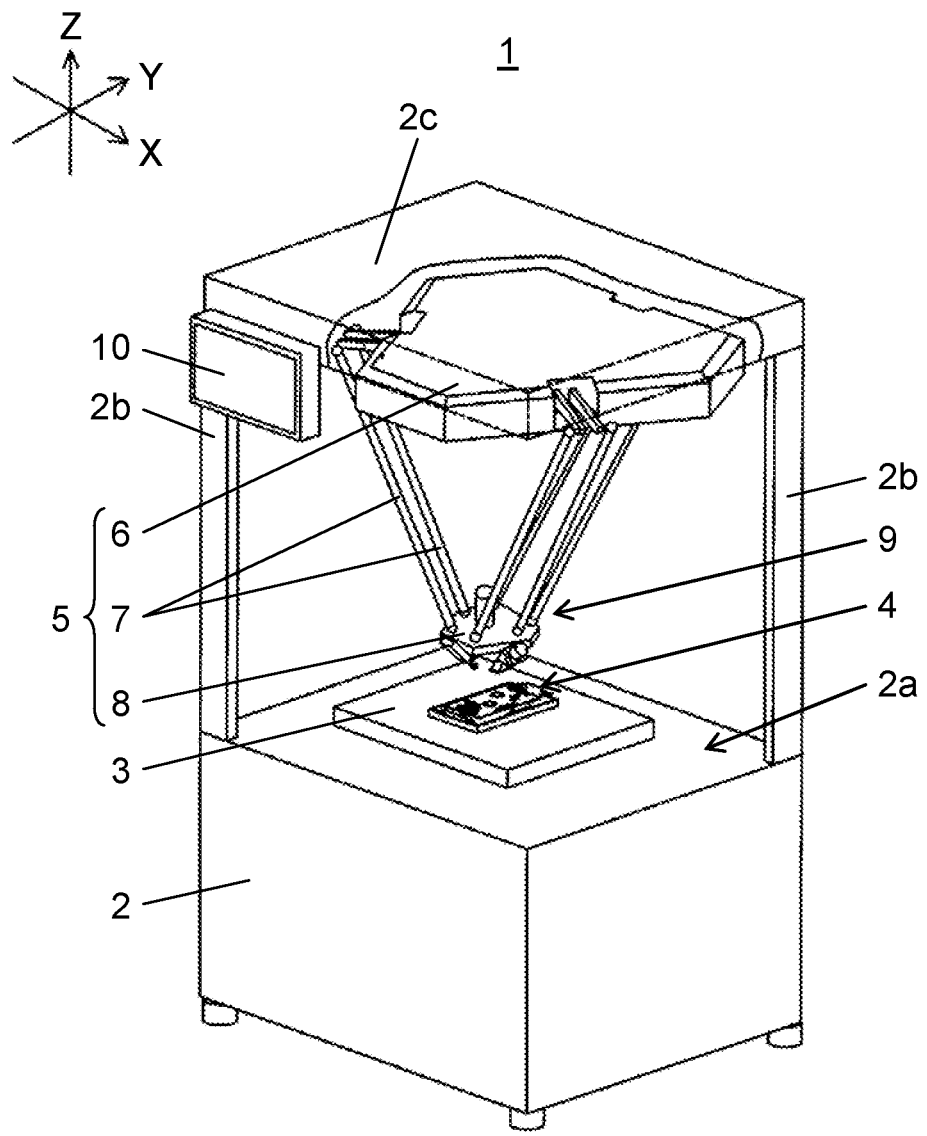
FIG. 1 is a perspective view of an electronic device manufacturing apparatus of an exemplary embodiment.

Next, the exemplary embodiment will be described with reference to the drawings. First, the entire configuration of electronic device manufacturing apparatus 1 will be described with reference to FIG. 1. FIG. 1 is a perspective view of electronic device manufacturing apparatus 1 of the exemplary embodiment. Electronic device manufacturing apparatus 1 regards electronic device 4, such as an on-board device, as a work target, and as illustrated in FIGS. 2 and 3, work for installing belt-shaped cable 15, such as a flexible print board, on connector 13 that configures a part of an electronic circuit of electronic device 4 that is a workpiece, is performed.

In FIG. 1, work stage 3 is provided on upper surface 2a of base 2. Work stage 3 positions and holds electronic device 4 which is the work target. Here, with reference to FIGS. 2 and 3, electronic device 4 which is the work target will be described. In addition, FIG. 2 illustrates a state of electronic device 4 before installing cable 15 on connector 13. In addition, FIG. 3 illustrates a state of electronic device 4 in which cable 15 is installed on connector 13.

Figure 2:
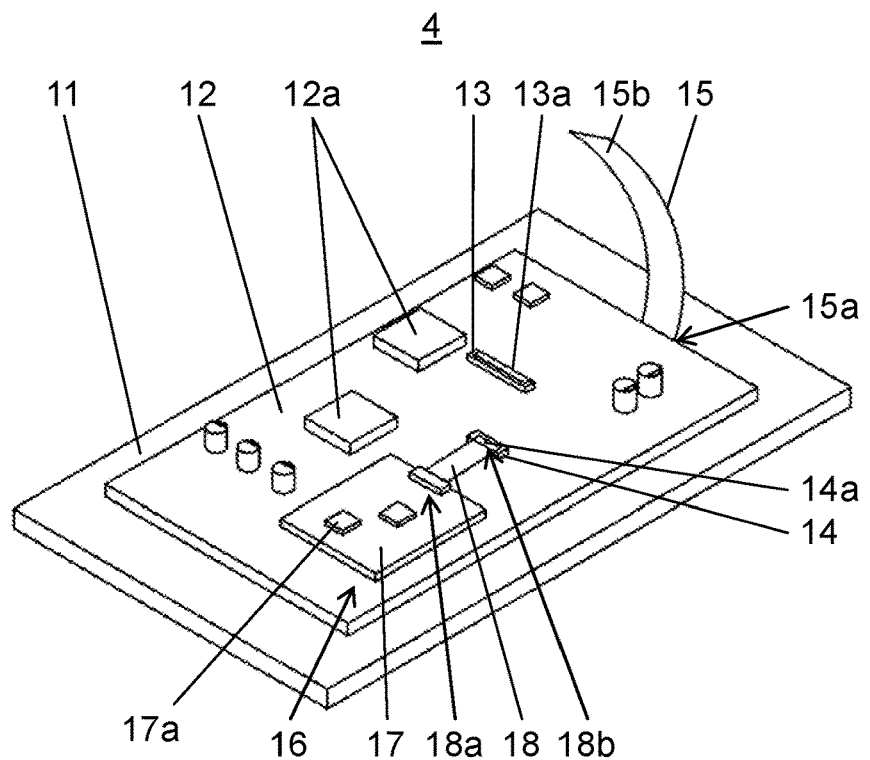
FIG. 2 is a perspective view of an electronic device (before cable installation) which is a work target of the electronic device manufacturing apparatus of the exemplary embodiment.
Figure 3:
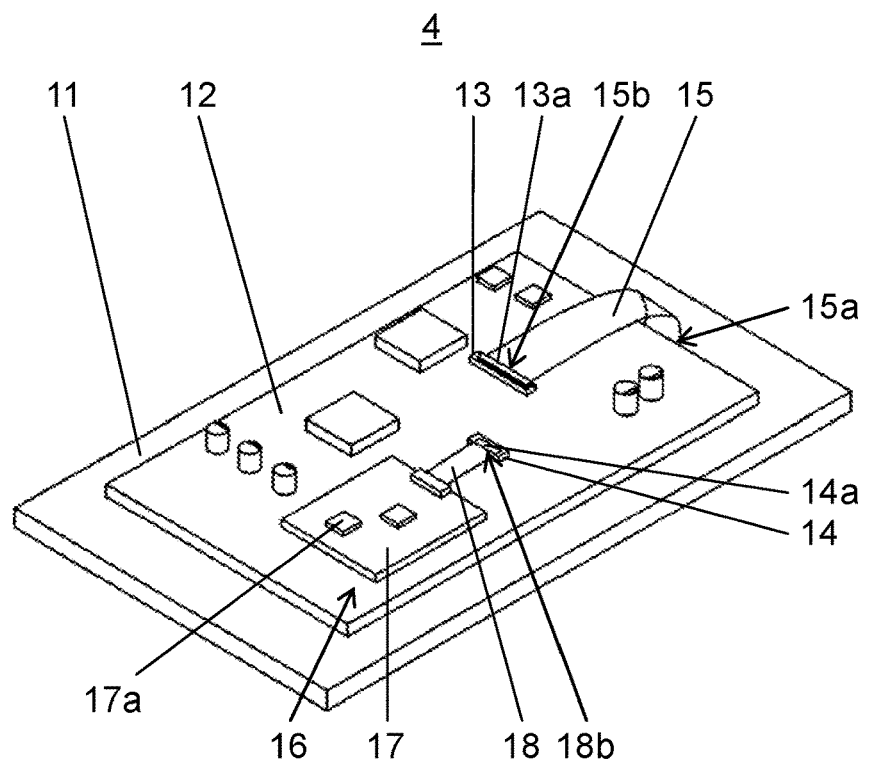
FIG. 3 is a perspective view of the electronic device (after cable installation) which is a work target of the electronic device manufacturing apparatus of the exemplary embodiment.

In FIG. 2, electronic device 4 is an on-board electronic device including a display device. Circuit board 12 which is a main body of electronic device 4 is transported into work stage 3 in a state of being held by board carrier 11 for handling. Circuit board 12 has a rectangular shape. On the upper surface of circuit board 12, a plurality of electronic components 12a are mounted. On one side of circuit board 12, cable 15 which is the work target is installed in advance. In a state where one end 15a is connected to the electronic circuit (not illustrated) provided on circuit board 12, cable 15 is installed in a posture in which the other end at which installed portion 15b is provided is oriented upward. In other words, the one end 15a of cable 15 is connected to the electronic circuit (not illustrated) provided on circuit board 12. Installed portion 15b of cable 15 is a free end having an upward posture.

On a mounting surface of circuit board 12, connector 13 for installing cable 15 is provided. In the work in which electronic device 4 is regarded as a target by electronic device manufacturing apparatus 1, work for installing cable 15 on connector 13 is performed. Furthermore, on the mounting surface of circuit board 12, sub-unit 16 having a configuration in which one end 18a of a cable 18 is connected to an end portion of a sub-board 17 on which an electronic component 17a is installed, is placed in advance. An installed portion 18b formed at the other end of the cable 18 is placed in a state of being installed on connector 14 provided on the mounting surface of circuit board 12.

On connector 13, installed portion 15b formed at the other end opposite to the one end 15a of cable 15 is installed. In connector 13, on terminal surface 13c (refer to FIG. 9) of a bottom surface of installer 13b on which installed portion 15b is installed, terminal rows for connection are formed. In a state where installed portion 15b is inserted and installed on connector 13, a wiring pattern (not illustrated) formed in installed portion 15b comes into contact with the terminal rows.

In connector 13, swing section 13a (also refer to FIG. 11) which configures a lock mechanism for preventing the installed portion 15b from dropping out, is included. Swing section 13a is provided to be oscillatable and freely openable and closable with respect to connector 13. In a state where electronic device 4 is transported into work stage 3 before installing installed portion 15b on connector 13, swing section 13a is in a posture of standing in advance, that is, in a state where the locked state is released (refer to FIG. 9). In addition, as illustrated in FIG. 3, after installing installed portion 15b on connector 13, the locked state becomes efficient. In other words, swing section 13a is pushed down and in a closed state, and installed portion 15b is pushed in by swing section 13a and is prevented from dropping out. In FIG. 1, a raising and lowering operation and a rotation operation in a horizontal surface are possible with respect to work stage 3. In the installing work of cable 15 which regards electronic device 4 as the work target, by raising and lowering work stage 3, electronic device 4 is positioned at a predetermined work height. In addition, by rotating work stage 3, a side on which connector 13 which is the work target is provided in electronic device 4, is positioned at the predetermined working position by robot section 5 which will be described hereinafter.

Corner post 2b stands at a corner of upper surface 2a of base 2, and horizontal frame 2c is built at an upper end part of corner post 2b. Operation panel 10 provided with a touch panel is disposed on a side surface of frame 2c. An instruction input for an operation or an operation instruction which regards robot section 5 as a target, is executed by a touch operation input via operation panel 10. Operation panel 10 has a display function. Notification in a case where an abnormality or a defect is generated in a cable installation operation by electronic device manufacturing apparatus 1, is displayed on operation panel 10. In addition, regarding a coordinate system of electronic device manufacturing apparatus 1, a direction horizontal from side to side when viewed from a front surface of an operation device is an X axis, an axis orthogonal to the X axis in a forward-and-rearward direction is a Y axis, and an axis orthogonal to the X axis and the Y axis in the upward-and-downward direction is a Z axis.

On a lower surface of frame 2c, fixing base section 6 in which a driving mechanism of robot section 5 which will be described hereinafter is embedded is disposed. Six servo driving mechanisms which are individually operated is embedded in fixing base section 6, and each of the servo driving mechanisms individually drives six link members 7 which extend downward from fixing base section 6. The lower end portion of link member 7 is coupled to base section 8. In the above-described configuration, fixing base section 6, link member 7, and base section 8 configure robot section 5.

Robot section 5 is a six-free degree type parallel link robot including six link members 7 which are individually operated, and the lower end portion of six link members 7 which extend downward from fixing base section 6 is coupled to base section 8 of head section 9 which is a work unit that executes the installation work for installing cable 15 on connector 13.

Figure 4:
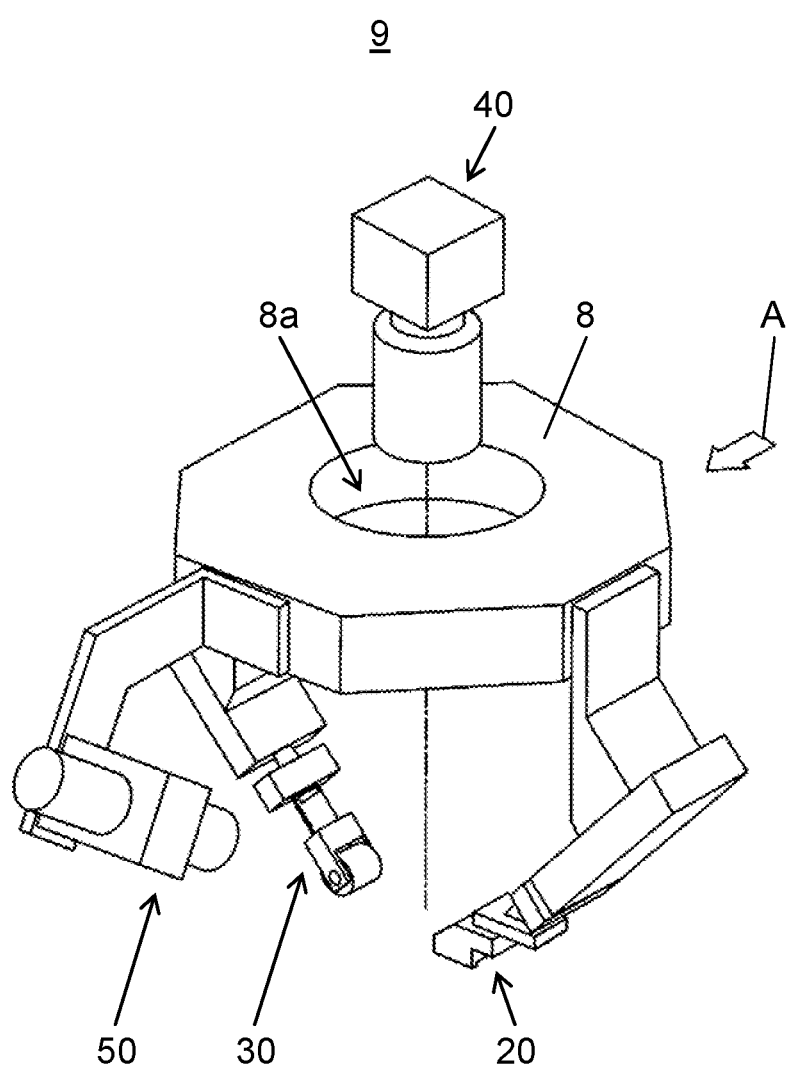
FIG. 4 is a perspective view of a head section incorporated in a robot section of the electronic device manufacturing apparatus of the exemplary embodiment.
Figure 5:
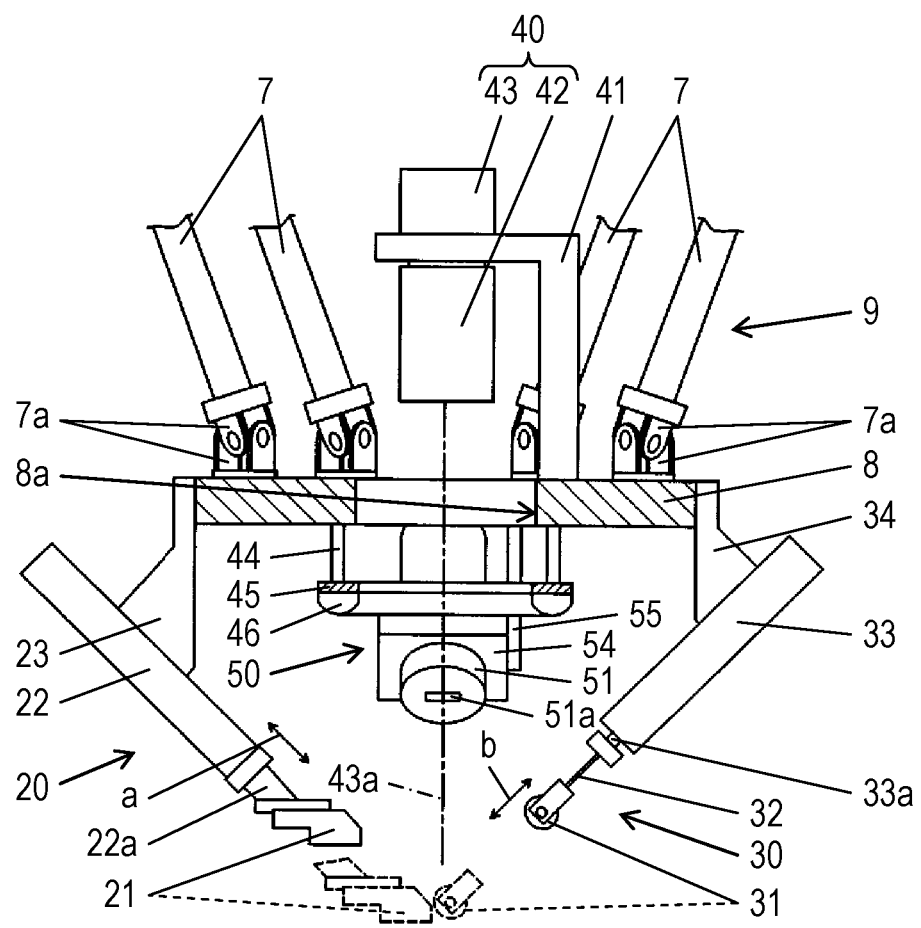
FIG. 5 is a configuration view illustrating the head section incorporated in the robot section of the electronic device manufacturing apparatus of the exemplary embodiment.

Next, with reference to FIGS. 4 and 5, a configuration of head section 9 will be described. FIG. 4 is a perspective view of head section 9 incorporated in robot section 5 of electronic device manufacturing apparatus 1 of the exemplary embodiment. FIG. 5 is a configuration view illustrating head section 9 incorporated in robot section 5 of electronic device manufacturing apparatus 1 of the exemplary embodiment. In addition, FIG. 5 illustrates a view when viewed from an A arrow in FIG. 4. In FIG. 4, base section 8 is a polygonal plate-like member having circular opening 8a at a center part. On opposing sides of base section 8, cable holding tool 20 and connector lock tool 30 are attached in a posture in which each of lower portions thereof is inclined toward the center of base section 8. On a side orthogonal to an opposing line on which cable holding tool 20 and connector lock tool 30 oppose each other, projector 50 is attached in a posture in which the lower portion thereof is inclined toward the center of base section 8. Furthermore, above opening 8a, imager 40 is disposed in a posture in which an imaging direction is oriented perpendicularly downward.

As illustrated in FIG. 5, link member 7 is coupled to base section 8 via universal joint 7a. In addition, by the configuration, it is possible to perform a moving operation of six-free degree with respect to cable holding tool 20, connector lock tool 30, and projector 50 which are attached to base section 8, by robot section 5. Accordingly, it is possible to relatively move cable holding tool 20, connector lock tool 30, imager 40, and projector 50, with respect to electronic device 4 held by work stage 3. Cable holding tool 20 has a function of holding cable 15 installed on connector 13. Connector lock tool 30 is used for making the lock mechanism included in connector 13 efficient. Imager 40 takes image of cable 15 held by cable holding tool 20 and connector 13 of electronic device 4 which is a workpiece held by work stage 3. In addition, projector 50 projects the light for height measurement, to cable 15 held by cable holding tool 20 and connector 13 of electronic device 4 held by work stage 3.

Figure 8:
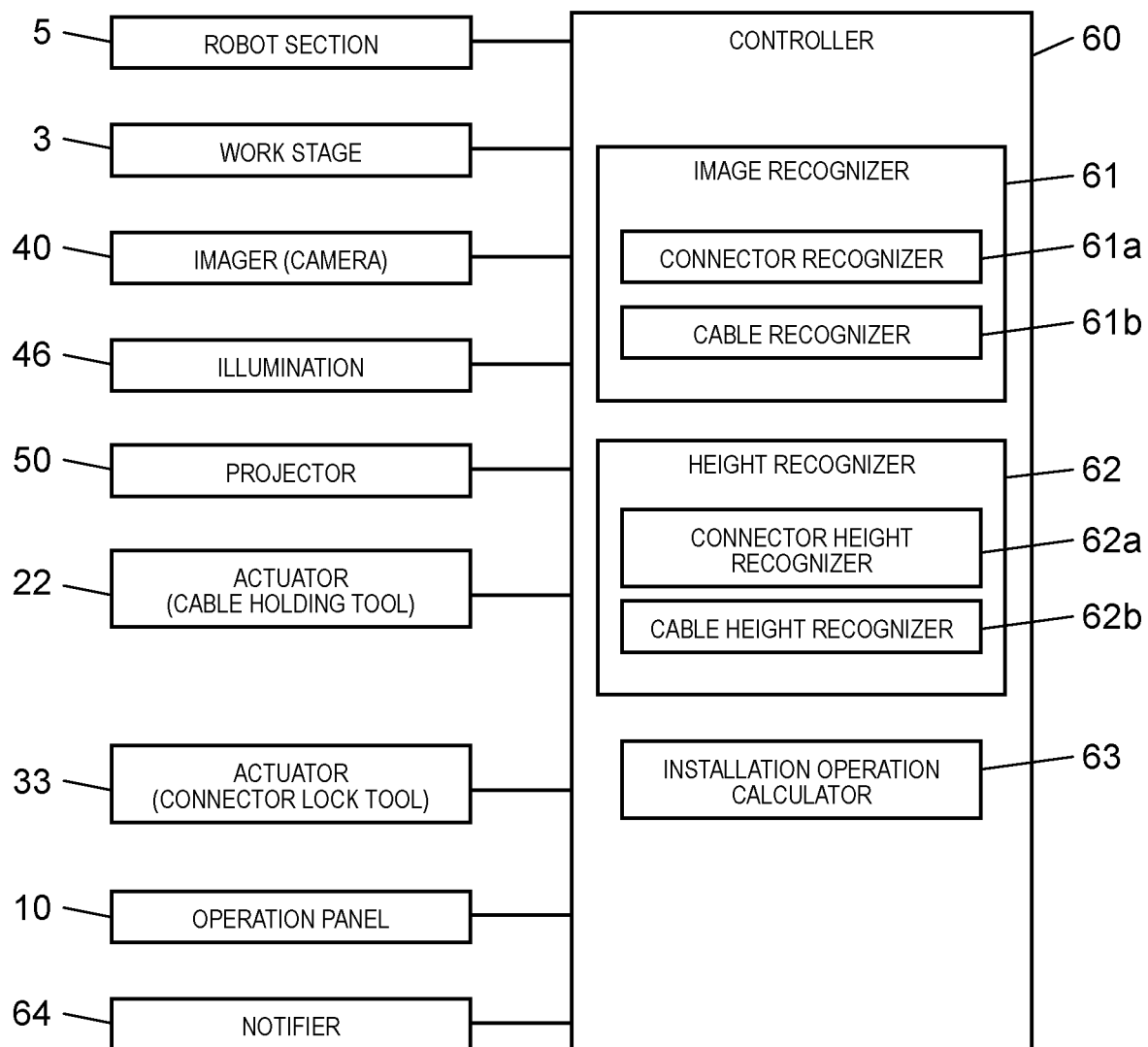
FIG. 8 is a block diagram illustrating a configuration of a control system of the electronic device manufacturing apparatus of the exemplary embodiment.

Robot section 5, cable holding tool 20, connector lock tool 30, imager 40, and projector 50 are operated by control performed by controller 60 (refer to FIG. 8). By the operation, processing for the cable installation work for installing belt-shaped cable 15 on connector 13 that configures a part of the electronic circuit of electronic device 4, and image recognition and height recognition which are accompanied by the cable installation operation, are executed by electronic device manufacturing apparatus 1.

Next, a configuration of cable holding tool 20 will be described. In base section 8 illustrated in FIG. 5, holding bracket 23 which extends downward is coupled to a side portion separated in the leftward direction from opening 8a provided at the driving center illustrating the center position of the plurality of universal joints 7a. In the lower end portion of holding bracket 23, actuator 22 having a configuration in which driving member 22a advances and retreats is coupled in a posture in which an advancing and retreating direction is oriented to be diagonally downward to the inner side. In a tip end portion of driving member 22a, cable holder 21 having a function of holding cable 15 by vacuum-sucking by a holding surface provided on the lower surface, is coupled. By driving actuator 22, cable holder 21 advances and retreats diagonally downward (arrow a) to the inner side toward the driving center in head section 9.

Next, a configuration of connector lock tool 30 will be described. In FIG. 5, in a side portion separated in the rightward direction from opening 8a, holding bracket 34 which extends downward is coupled. In the lower portion of holding bracket 34, an actuator 33 having a configuration in which a driving member 33a advances and retreats is coupled in a posture in which the advancing and retreating direction is diagonally downward to the inner side. At the tip end of the driving member 33a, roller 31 is coupled via a buffer 32 made of an elastic material, such as a plate spring. By driving the actuator 33, roller 31 advances and retreats in the inward diagonal direction (arrow b).

As described above, the lock mechanism included in connector 13 performs fixing of installed portion 15b to connector 13 by pushing down swing section 13a provided to freely stand to connector 13 by using connector lock tool 30. In order to achieve a state where swing section 13a is pushed down in connector 13 and the locked state is efficient, roller 31 abuts against swing section 13a in a standing state from the side surface side, and swing section 13a is pushed down by roller 31 (refer to FIG. 13(c)).

Next, a configuration and a function of imager 40 will be described. In a bracket 41 which stands in the vicinity of opening 8a on the upper surface of base section 8, imager 40 configured with optical lens section 42 and camera 43 is disposed in a downward posture in which an optical axis 43a is oriented toward work stage 3 side. In other words, imager 40 is attached to base section 8 which moves together with cable holding tool 20 by robot section 5. In a state where robot section 5 is operated and head section 9 is positioned above electronic device 4 held by work stage 3, the imaging is performed by imager 40. By the operation, an image (first image) of installed portion 15b of cable 15 held by cable holding tool 20 and connector 13 of electronic device 4 held by work stage 3, is obtained.

Support member 44 stands at a lower part in a disposition that surrounds opening 8a on the lower surface side of base section 8. In the lower end portion of support member 44, illumination holding plate 45 which corresponds to an external shape of electronic device 4 is held. On a lower surface of illumination holding plate 45, illumination 46 which is configured with a light emitting body, such as a light emitting diode (LED) is installed. When the imaging is performed by imager 40, cable 15 and connector 13 which are imaging targets are illuminated by turning on illumination 46.

Next, a configuration and a function of projector 50 will be described. At a position orthogonal to the opposing line on which cable holding tool 20 and connector lock tool 30 oppose each other in base section 8, projector 50 is disposed. Projector 50 includes light emitter 51 provided with slit hole 51a for irradiating the tip end surface with slit light. Light emitter 51 is engaged with and held by a holding block 54 coupled to base section 8 by a fixing bracket 55, and is disposed in a posture in which slit hole 51a is oriented diagonally downward to the inner side.

Figure 6:
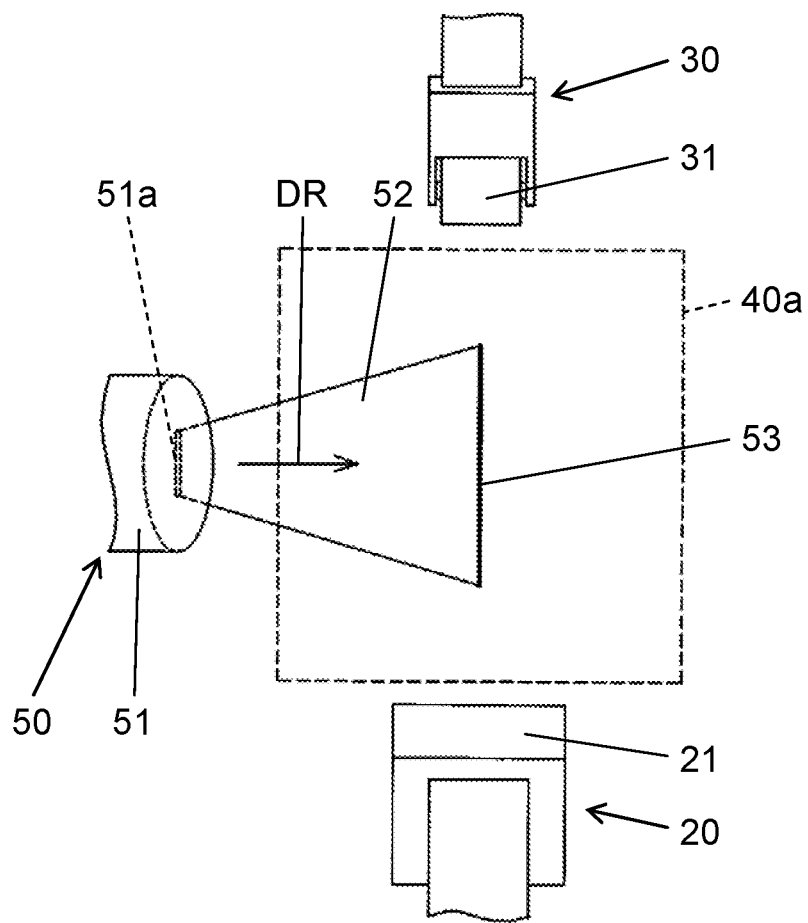
FIG. 6 is a view illustrating a projection state of light for height measurement in a view illustrating height measurement in the electronic device manufacturing apparatus of the exemplary embodiment.

FIG. 6 illustrates a state where light for height measurement is projected from projector 50 disposed in this manner. In other words, by operating projector 50, slit-shaped slit light 52 of which a luminous flux is narrowed in one direction from slit hole 51a of light emitter 51 is projected to cable 15 and connector 13 which are measurement targets which are at a position sandwiched between cable holding tool 20 and connector lock tool 30 from a light projection direction DR (refer to FIG. 7(a)). The measurement target is positioned in imaging visual field 40a of imager 40, the measurement target is taken by imager 40 in a state where projector 50 is operated, and accordingly, an image (second image) of cable 15 and connector 13 which are irradiated with the light for height measurement is obtained.

In the second image, slit light 53 expressed on a screen as slit light 52 with which the measurement target is irradiated is reflected and is received by camera 43 of imager 40, is included. In other words, slit light 53 is a slit light image in the image reflected and taken by slit light 52, and all of the "slit light" to which reference numbers including "53" are attached in the specification mean slit light images.

Figure 7:
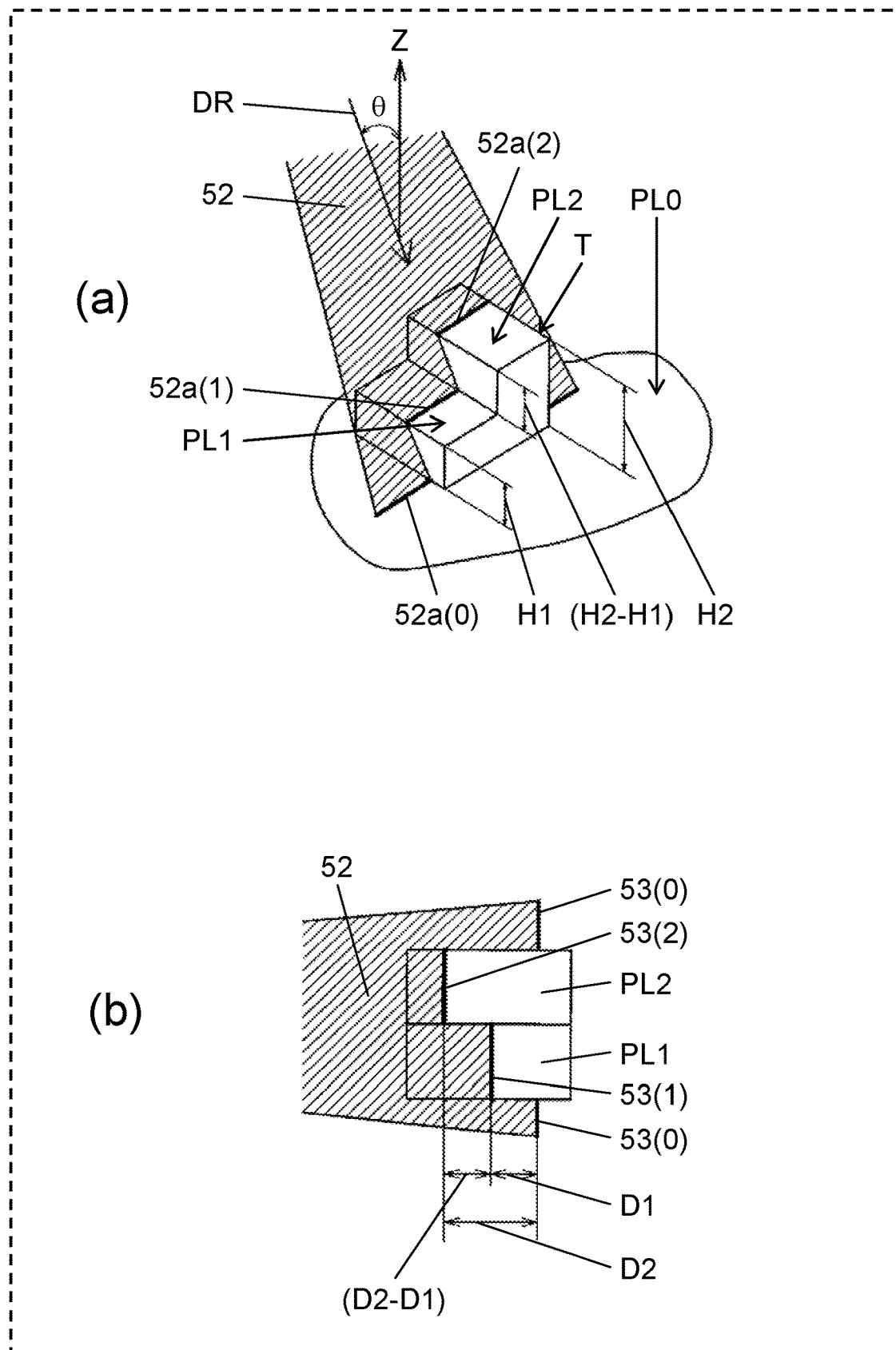
FIG. 7 is a view illustrating a principle of the height measurement in the electronic device manufacturing apparatus of the exemplary embodiment.

In the exemplary embodiment, the height of the measurement target is measured based on the second image including the above-described slit light 53. FIG. 7 illustrates a measurement principle of the height measurement performed in this manner. Here, an example in which heights of two surfaces having different heights of the upper surface of a measurement target T placed on a reference plane PL0, that is, measurement target surfaces PL1 and PL2 which are at positions of each of height dimensions H1 and H2 with respect to the reference plane PL0, are measured, is illustrated.

As illustrated in FIG. 7(a), in the measurement target T, slit light 52 for height measurement is projected from the light projection direction DR that makes a predetermined inclination angle θ with respect to the Z axis that is a perpendicular direction. In addition, as the reference plane PL0 and the measurement target surfaces PL1 and PL2 are irradiated with slit light 52, each of slit light irradiation lines 52a(0), 52a(1), and 52a(2) is expressed by slit light 52 on the surfaces.

In addition, in a plane image obtained by taking an image of the measurement target T in a state of being irradiated with slit light 52 from above, as illustrated in FIG. 7(b), slit light 53(0), 53(1), and 53(2) which are obtained by receiving the light reflected from slit light irradiation lines 52a(0), 52a(1), and 52a(2), are expressed. In the plane image, slit light 53(1) and 53(2) are expressed at a position separated only by each of plane dimensions D1 and D2 from slit light 53(0).

The plane dimensions D1 and D2 are generated as slit light 52 is projected from the light projection direction DR inclined only by the inclination angle θ from the Z axis. Therefore, by obtaining the plane dimensions D1 and D2 illustrated in FIG. 7(b), it is possible to acquire height dimensions H1 and H2 illustrated in FIG. 7(a) by a geometrical operation. In addition, in a case where an item which is necessary for the height measurement target is a height difference (H2−H1) of the measurement target surfaces PL1 and PL2, it may not be necessary to individually acquire the plane dimensions D1 and D2 illustrated in FIG. 7(b), and only the dimension difference (D2−D1) may be directly acquired from the plane image.

In the exemplary embodiment, slit light 52 for height measurement is projected by projector 50 with respect to cable 15 held by cable holding tool 20 and connector 13 of electronic device 4 held by work stage 3. In addition, the height difference between installed portion 15b of cable 15 and connector 13 is acquired by the second image obtained by taking an image of cable 15 and connector 13 in this state by using imager 40. According to this, when performing the cable installation operation by moving cable holding tool 20 by robot section 5, deviation from an appropriately regulated height difference is corrected.

Next, with reference to FIG. 8, a configuration of a control system of electronic device manufacturing apparatus 1 will be described. FIG. 8 is a block diagram illustrating a configuration of the control system of electronic device manufacturing apparatus 1 of the exemplary embodiment. Controller 60 is connected to robot section 5, work stage 3, imager 40 (camera), illumination 46, projector 50, actuator 22 which drives cable holding tool 20, the actuator 33 which drives connector lock tool 30, operation panel 10, and notifier 64.

Figure 9:
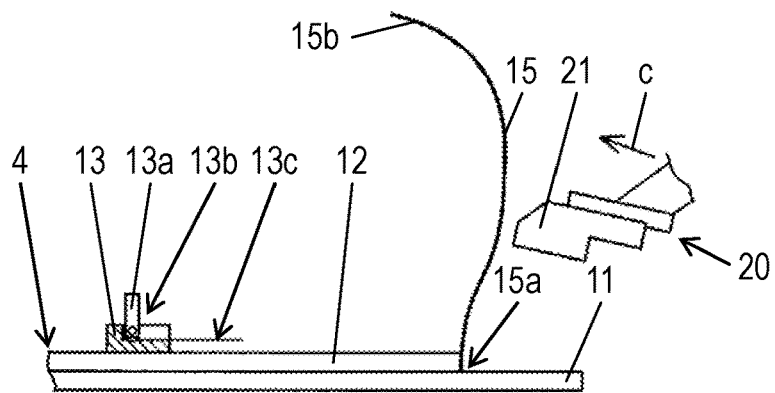
FIG. 9 is an operation view illustrating a cable installation operation by the electronic device manufacturing apparatus of the exemplary embodiment.
Figure 9:
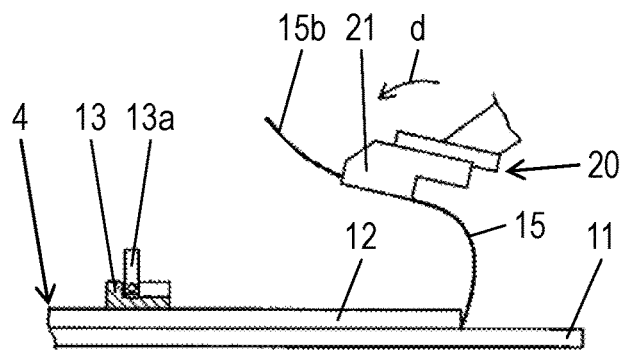
Figure 9:
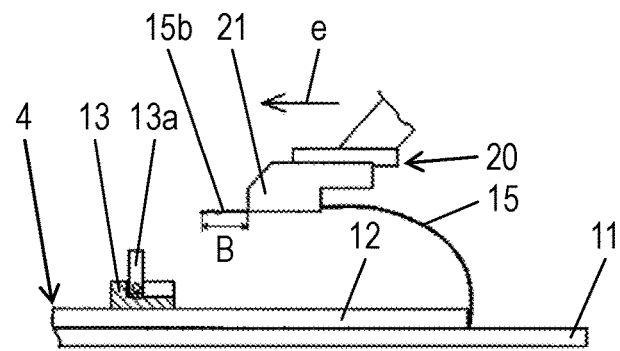
Figure 9:
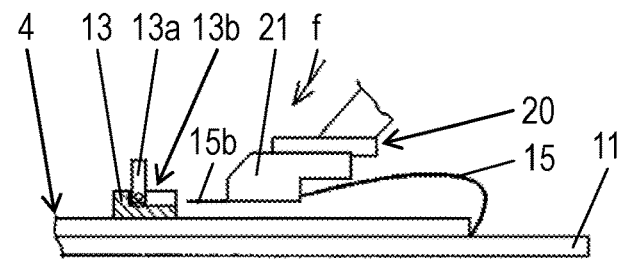
Figure 13:
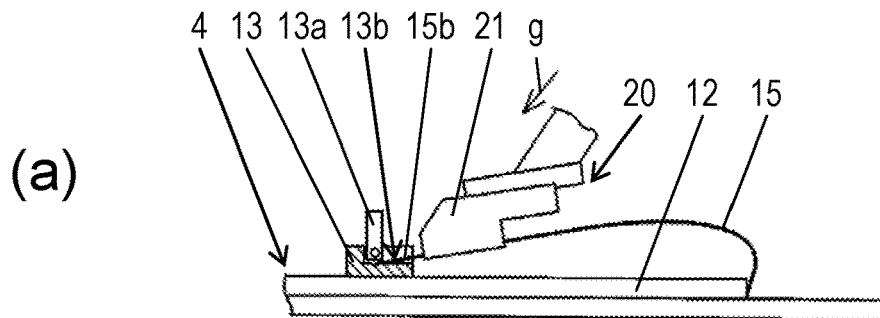
FIG. 13 is an operation view illustrating the cable installation operation by the electronic device manufacturing apparatus of the exemplary embodiment.
Figure 13:
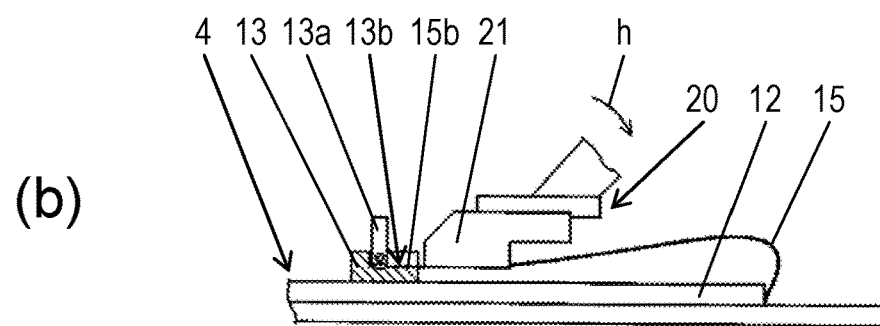
Figure 13:
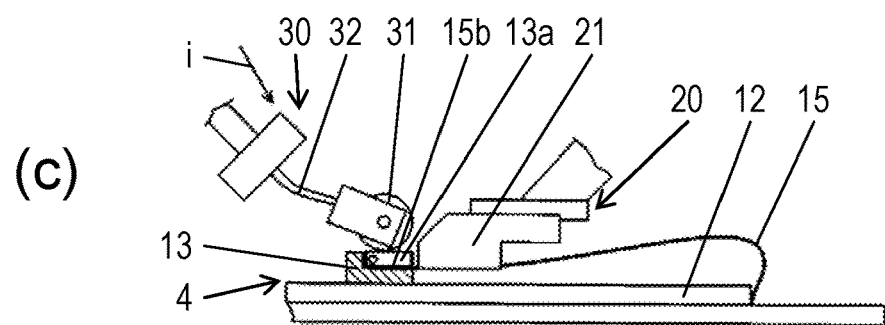
Figure 13:
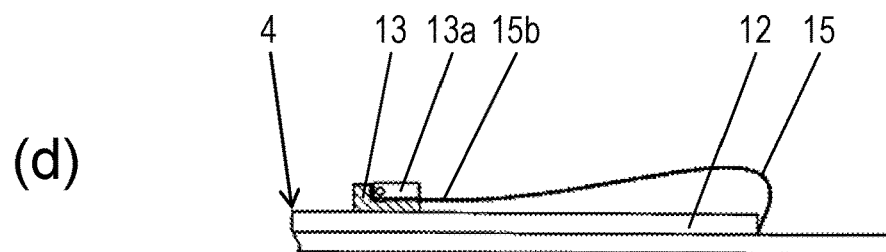
Figure 14:
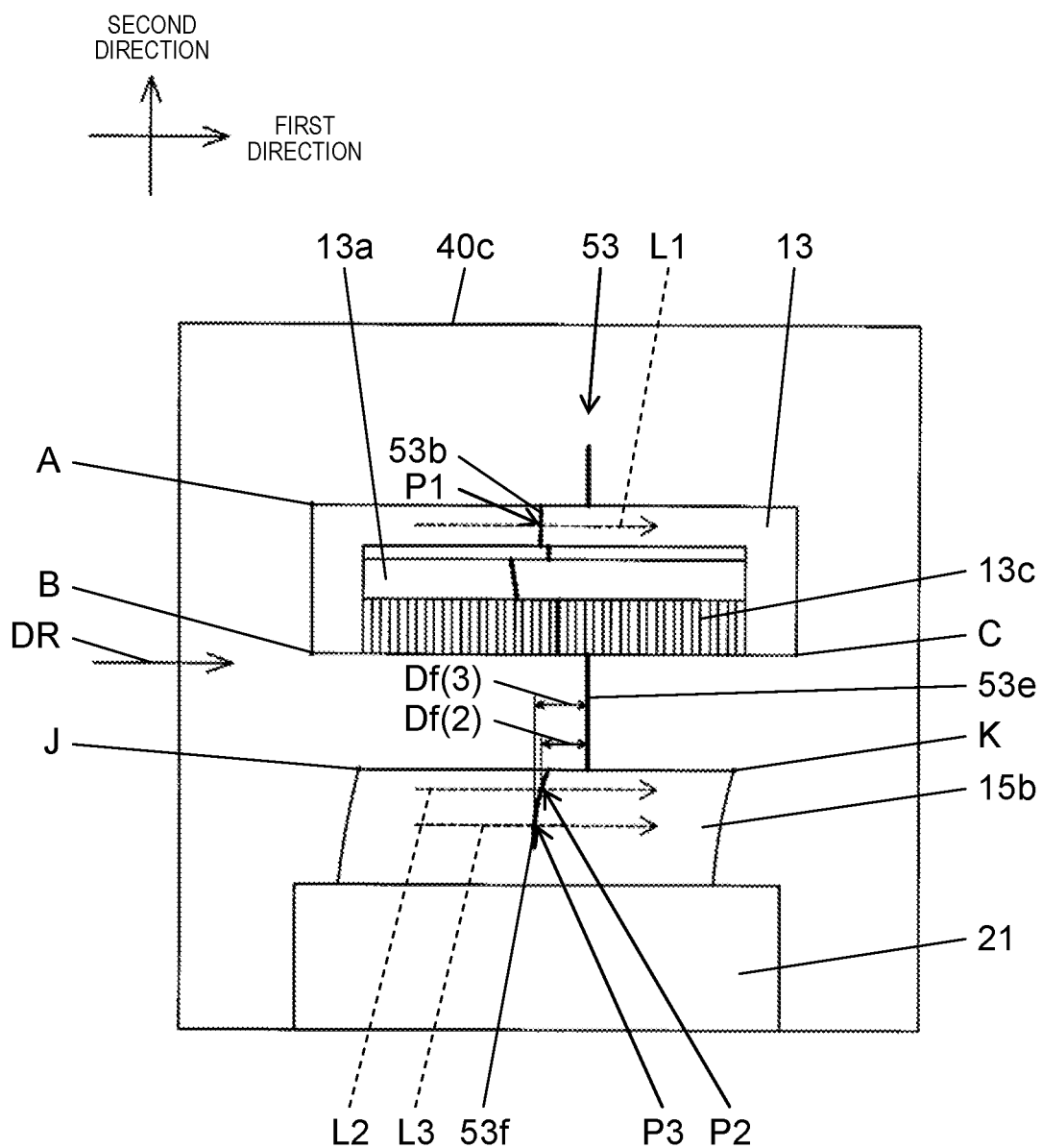
FIG. 14 is a view illustrating the height measurement in the position recognition of the connector and the cable by electronic device manufacturing apparatus of the exemplary embodiment.

As controller 60 controls robot section 5, work stage 3, actuator 22, and the actuator 33, the cable installation operation illustrated in FIGS. 9 and 13 is executed. In the execution process of the cable installation operation, controller 60 controls imager 40, projector 50, and illumination 46, and executes recognition processing for detecting positions in a two-dimensional plane direction and positions in a height direction of installed portion 15b of cable 15 held by cable holding tool 20 and connector 13 of electronic device 4 held by work stage 3. Here, the positions in the two-dimensional plane direction of cable 15 and connector 13 are positions in a case where cable 15 and connector 13 are viewed from above. In addition, the positions in the height direction of cable 15 and connector 13 are positions illustrating the heights of cable 15 and connector 13, in a direction which is substantially orthogonal to the positions in the two-dimensional plane direction. An operation instruction for executing the processing is input via operation panel 10, and accordingly, controller 60 executes predetermined control processing. Notifier 64 performs processing for displaying notification in a case where an abnormality or a defect is generated in the execution process of the cable installation operation by electronic device manufacturing apparatus 1, on operation panel 10.

In addition, controller 60 may include image recognizer 61, height recognizer 62, and installation operation calculator 63 which serve as an inner control processing function. Furthermore, image recognizer 61 may be configured to include connector recognizer 61a and cable recognizer 61b. Height recognizer 62 may be configured to include connector height recognizer 62a and cable height recognizer 62b.

Connector recognizer 61a and cable recognizer 61b of image recognizer 61 respectively recognize the positions of cable 15 and connector 13 by the first image (refer to recognized image 40b illustrated in FIG. 10) of cable 15 and connector 13 taken by imager 40. Imager 40 and image recognizer 61 configure a first position detector which detects a position (a position viewed from above) in the two-dimensional plane direction of cable 15 held by cable holding tool 20 and connector 13 of electronic device 4 held by work stage 3.

Connector height recognizer 62a and cable height recognizer 62b of height recognizer 62 respectively recognize the heights of cable 15 and connector 13 by the second image (refer to recognized image 40c illustrated in FIG. 11) of cable 15 and connector 13 which are irradiated with the light (slit light 52) for height measurement taken by using imager 40. Imager 40, projector 50, and height recognizer 62 configure the second position detector which detects the positions in the height direction of cable 15 held by cable holding tool 20 and connector 13 of electronic device 4 held by work stage 3.

In the cable installation operation for installing cable 15 on connector 13 by moving cable holding tool 20 by robot section 5, installation operation calculator 63 performs position correction calculation when moving cable holding tool 20 by robot section 5 based on the detection result by the first position detector and the detection result by the second position detector. Here, the detection result of the first position detector is the detection result at the position in the two-dimensional plane direction of cable 15 and connector 13. The detection result of the second position detector is the detection result at the position in the height direction of cable 15 and connector 13. In other words, controller 60 controls robot section 5 based on the detection results of the first position detector and the second position detector in the cable installation operation.

Next, with reference to FIGS. 9 and 13, the cable installation work by electronic device manufacturing apparatus 1 having the above-described configuration will be described. FIGS. 9 and 13 are operation views illustrating the cable installation operation by electronic device manufacturing apparatus 1 of the exemplary embodiment. The cable installation work illustrated here corresponds to an electronic device manufacturing method for installing belt-shaped cable 15 on connector 13 that configures a part of the electronic circuit of electronic device 4.

When performing the cable installation work, first, electronic device 4 which is the workpiece including connector 13 is transported into electronic device manufacturing apparatus 1 and is held by work stage 3 (workpiece holding step). FIG. 9(a) illustrates a state of electronic device 4 before being held by work stage 3 and executing the cable installation operation. In other words, cable 15 which is the target of the cable installation work is in a state where the one end 15a is connected to the electronic circuit (not illustrated) formed on circuit board 12 in electronic device 4, and in a posture in which installed portion 15b provided at the other end is oriented upward. In electronic device 4 in a state of being transported in on the work stage 3, connector 13 is in a state where swing section 13a stands and the locked state is released.

Next, the cable installation work for installing installed portion 15b of cable 15 is started in connector 13. Here, first, robot section 5 is operated and cable holding tool 20 is moved (arrow c). In addition, the tip end of cable holder 21 of cable holding tool 20 approaches cable 15 having a standing posture. Next, as illustrated in FIG. 9(b), a temporarily holding operation is performed with respect to cable holding tool 20 (arrow d). In other words, the holding surface provided on the lower surface of cable holder 21 comes into contact with an intermediate position of cable 15, and cable 15 is temporarily held by vacuum-sucking.

Next, the holding position adjusting operation is performed. In other words, as illustrated in FIG. 9(c), installed portion 15b of cable 15 moves cable holding tool 20 such that a state of protruding only by a protrusion length B regulated in advance from the tip end of cable holder 21 (arrow e), and the holding position by cable holder 21 is adjusted. In addition, after adjusting the holding position of cable 15, by vacuum-sucking cable 15 by cable holder 21, cable 15 is held by cable holding tool 20 (cable holding step).

Next, as illustrated in FIG. 9(d), by moving cable holding tool 20 which holds cable 15 (arrow f), installed portion 15b of cable 15 held by cable holding tool 20 is temporarily positioned with respect to connector 13 (temporary positioning step). The temporary positioning is performed while adjusting the position of cable holding tool 20 such that installed portion 15b of cable 15 is positioned in imaging visual field 40a in which the imaging by camera 43 of imager 40 is possible at the same time as connector 13. Here, the temporary positioning of cable holding tool 20 is set in advance such that installed portion 15b which protrudes only by the protrusion length B from cable holder 21 is positioned in the above-described imaging visual field 40a.

In the temporary positioned state, installed portion 15b of cable 15 held by cable holder 21 of cable holding tool 20 is in a state of being also position-shifted in the height direction caused by curvature deformation or the like of cable 15, in addition to the position shift in the two-dimensional direction plane caused by the position error in the holding operation. Furthermore, regarding connector 13, due to a position holding error of electronic device 4 in work stage 3, a position error of connector 13 in electronic device 4, a shape error of connector 13 itself, or the like, a state where the position is also shifted in the height direction in addition to the position shift in the two-dimensional plane direction, is also achieved. In other words, the relative positional relationship between connector 13 and installed portion 15b installed on connector 13 is in a state of a three-dimensional position shift including the position shifts in the two-dimensional plane direction and in the height direction, and further, the position-shifted state varies in each of the connectors 13 which are the installation work targets.

In order to correct variation of the positional relationship between connector 13 and cable 15, in electronic device manufacturing apparatus 1 illustrated in the exemplary embodiment, recognition processing for positioning connector 13 and installed portion 15b is performed by a recognition processing function of image recognizer 61 and height recognizer 62. Here, a first position detection step for detecting the positions in the two-dimensional plane direction of connector 13 and the temporarily positioned cable 15 is performed by the recognition processing function of image recognizer 61, and further, a second position detection step for detecting the positions in the height direction of connector 13 and the temporarily positioned cable 15 is performed by the recognition processing function of height recognizer 62.

Figure 10:
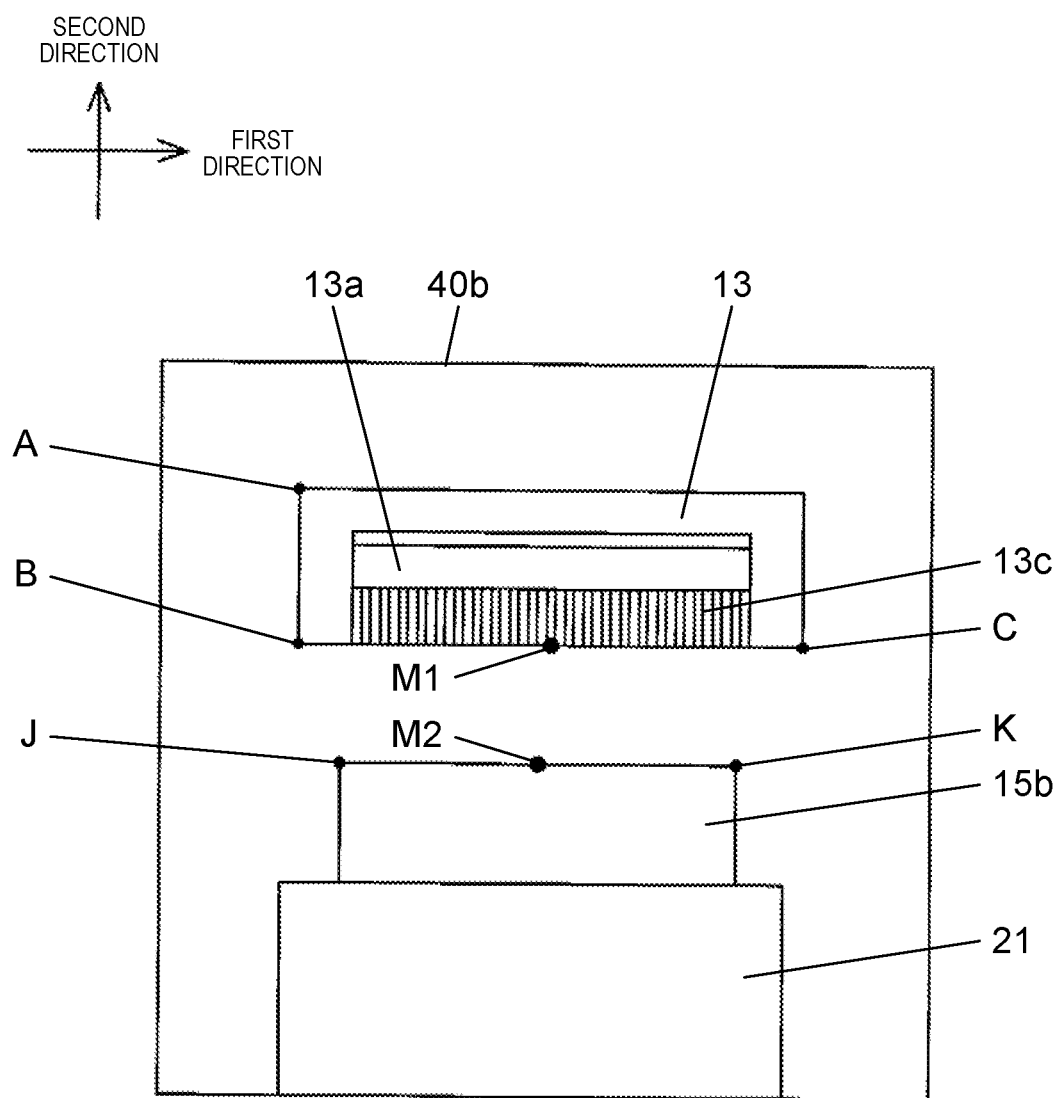
FIG. 10 is a view illustrating an image for position recognition of a connector and a cable in the electronic device manufacturing apparatus of the exemplary embodiment.

In the first position detection step, in the temporarily positioned state illustrated in FIG. 9(d), cable 15 which is held by cable holding tool 20 and is temporarily positioned, and connector 13 of electronic device 4 held by work stage 3, are taken by imager 40 (first imaging step). Accordingly, recognized image 40b which is the first image illustrated in FIG. 10 is obtained.

In recognized image 40b, the image of connector 13 before the cable installation when swing section 13a that configures the lock mechanism is in an open state, and the image when the tip end portion of cable holder 21 of cable holding tool 20 which holds cable 15 installed on connector 13 is viewed in a plan view, are expressed. In addition, in recognized image 40b, a longitudinal direction of connector 13 is defined as a first direction, and a direction which is orthogonal to the first direction and links installed portion 15b and connector 13 to each other is defined as a second direction. FIGS. 11, 14, 16 and 18 are also similar.

In addition, by recognized image 40b taken in the first imaging step, the positions of cable 15 and connector 13 are recognized by the recognition processing function of image recognizer 61 (first image recognition step). Specifically, positions of characteristic points, A, B, and C for detecting the position of connector 13 in recognized image 40b are acquired, and a middle point of the characteristic points B and C is a representative point M1 illustrating the position of connector 13 (refer to FIG. 10). Furthermore, positions of characteristic points J and K for detecting the position of installed portion 15b are acquired, and a middle point of the characteristic points J and K2 is a representative point M2 illustrating the position of installed portion 15b.

In the exemplary embodiment, in addition to the above-described position detection in the two-dimensional direction, the positions in the height direction of connector 13 and installed portion 15b of the temporarily positioned cable 15, are detected (second position detection step). In the second position detection step, the slit-shaped slit light (refer to slit light 52 illustrated in FIG. 6) is projected as the light for height measurement to installed portion 15b of cable 15 held by cable holding tool 20 and connector 13 of electronic device 4 held by work stage 3, by operating projector 50 (measurement light irradiation step).

Figure 11:
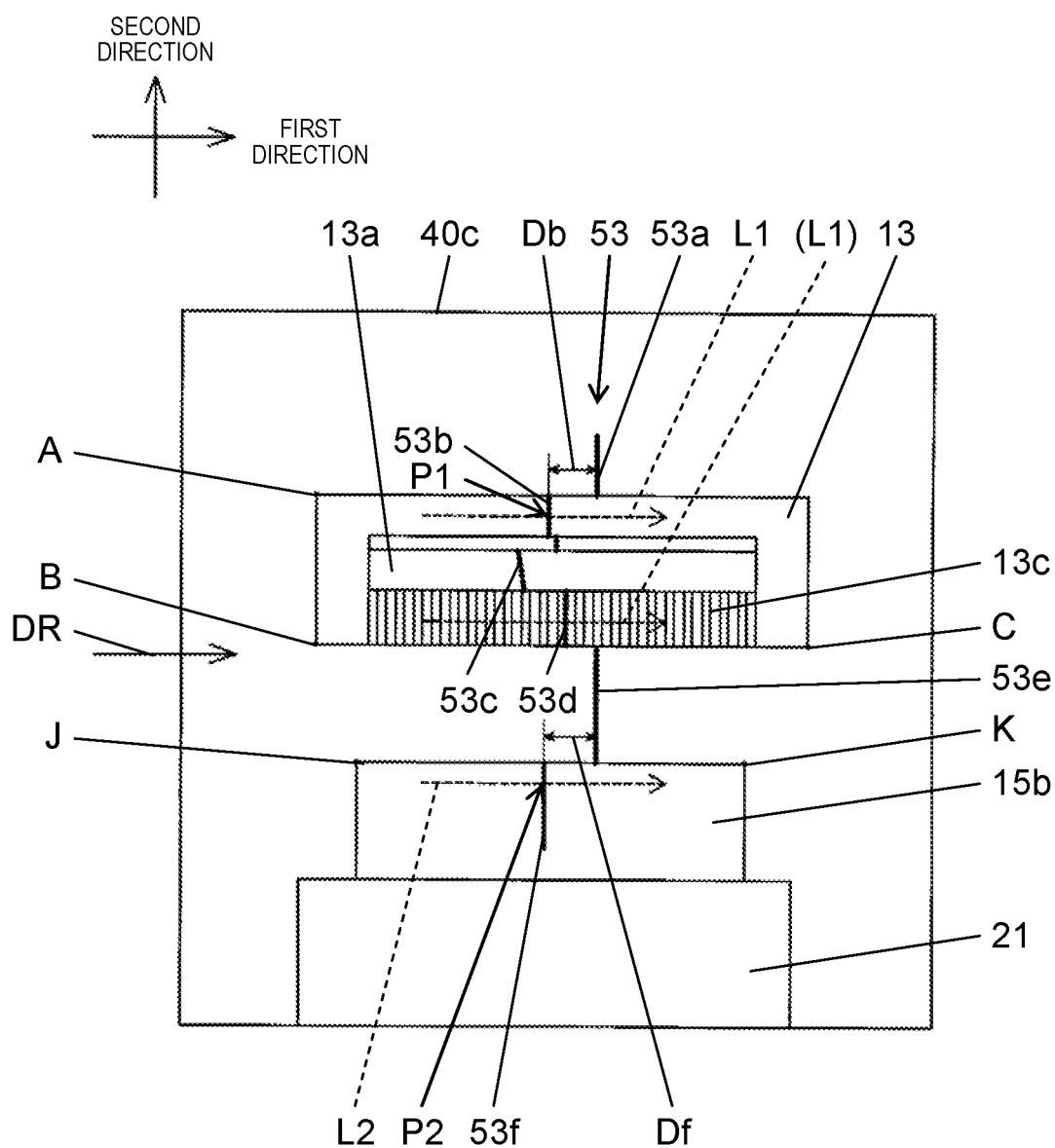
FIG. 11 is a view illustrating the height measurement in the position recognition of the connector and the cable by electronic device manufacturing apparatus of the exemplary embodiment.

Next, installed portion 15b of cable 15 and connector 13 which are irradiated with the light for height measurement are taken by imager 40 (second imaging process). Accordingly, recognized image 40c which is a second image illustrated in FIG. 11 is obtained. In addition, the heights of installed portion 15b of cable 15 and connector 13 are recognized by the recognition processing function of height recognizer 62, by recognized image 40c (second image recognition step).

Hereinafter, processing to be executed in the second position detection step will be described in detail. In the above-described recognized image 40c, slit light 53 which serves as the image obtained as the emitted slit light 52 is reflected by the surfaces of installed portion 15b of cable 15 and connector 13, and is received by camera 43, is included. Here, an irradiation range in the second direction including a range set as the measurement target in installed portion 15b which protrudes from cable holder 21 and the entire range of connector 13, is irradiated with slit light 52.

At the same time, as will be described in FIG. 6, while slit light 52 is emitted from the light projection direction DR inclined from the Z axis only by the regulated inclination angle θ, slit light 53 in recognized image 40c is expressed in a state of being position-shifted in the first direction which is the plane direction of the light projection direction DR in accordance with the height of the measurement target surface. In other words, since the upper surface of electronic device 4 installed in connector 13 in the measurement target is the lowest in the imaging range, slit light 53a and 53e by the reflected light of slit light 52 with which the part that corresponds to the upper surface of electronic device 4 is irradiated, are expressed on the most right side (side opposite to the light projection direction DR) in the first direction in recognized image 40c.

In addition, slit light 53 obtained by the reflected light from slit light 52 with which the upper surfaces of connector 13 and installed portion 15b is irradiated is expressed in recognized image 40c in a state where the position is shifted to the left side in the first direction in accordance with the heights of each of the parts. In other words, by the reflected light of each of the upper surface of connector 13, the inclined surface of swing section 13a of the standing state, the upper surface of terminal surface 13c, and the upper surface of installed portion 15b, slit light 53b, 53c, 53d, and 53f are expressed in the state where the position is shifted to the left side in the first direction in accordance with the height of each of the parts.

Here, since an object is to correct the height position when installing installed portion 15b in installer 13b (refer to FIG. 9(a)) of connector 13, the upper surface of connector 13 and the upper surface in the vicinity of the tip end portion in installed portion 15b are set as the measurement target part. In addition, in recognized image 40c, search lines L1 and L2 for detecting the slit light reflected on the measurement target parts are respectively set along the first direction.

Figure 12:
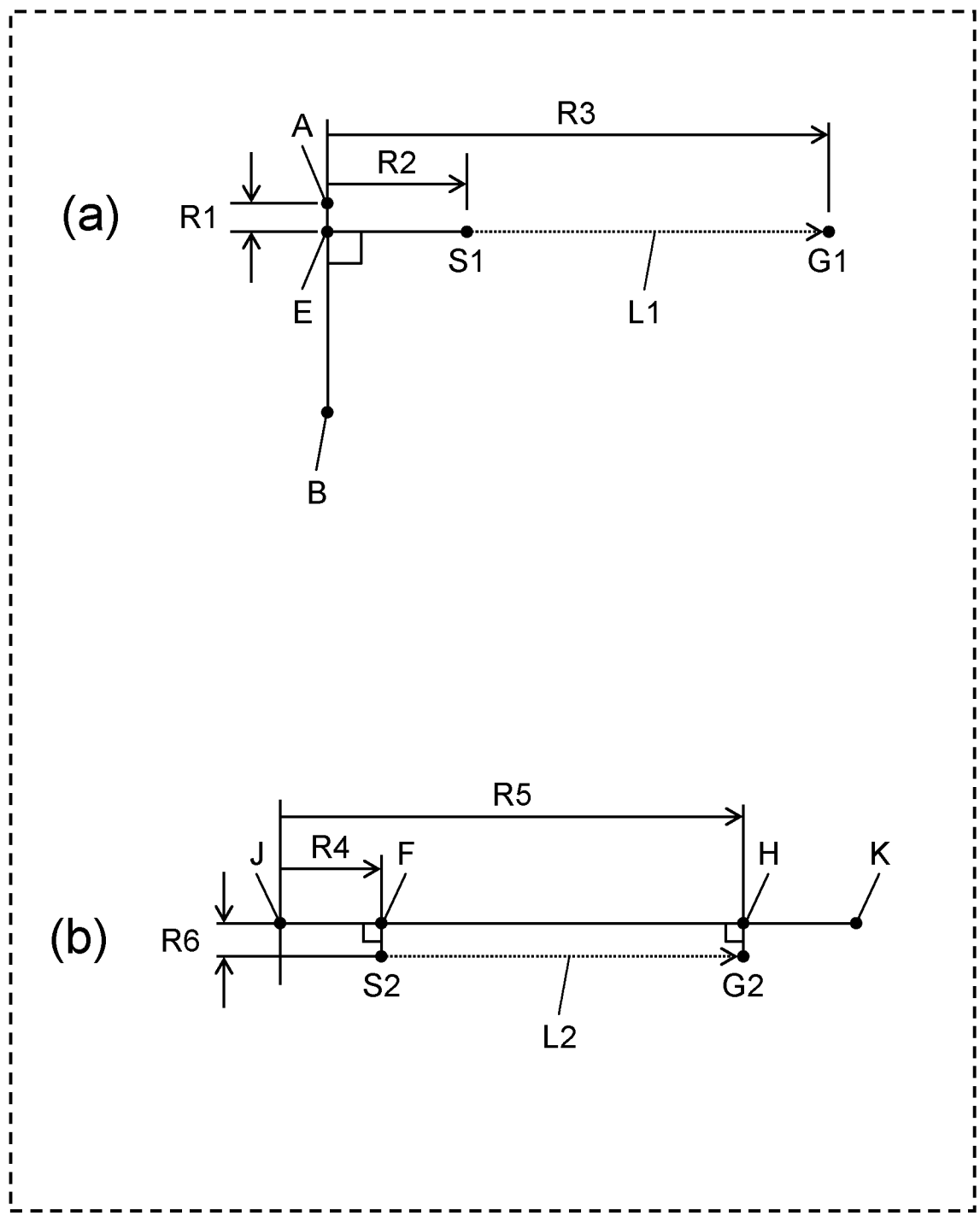
FIG. 12 is a view illustrating search line setting for the height measurement in the position recognition of the connector and the cable by electronic device manufacturing apparatus of the exemplary embodiment.

In other words, at the position which corresponds to the upper surface of connector 13 of recognized image 40c, the search line L1 is set as follows based on the characteristic points A and B and reference dimensions R1, R2, and R3 which are set to have a predetermined length in advance. As illustrated in FIG. 12(a), a point separated to the characteristic point B side only by the reference dimension R1 from the characteristic point A in a line segment AB which links the characteristic points A and B, is set to be an auxiliary point E. In addition, in a straight line in the first direction orthogonal to the line segment AB from the auxiliary point E, the search line L1 in which a point separated only by the reference dimension R2 from the auxiliary point E is set to be a search start position S1, and a point separated only by the reference dimension R3 from the auxiliary point E is set to be a search final position G1, is set.

In addition, at the position which corresponds to the upper surface in the vicinity of the tip end portion of installed portion 15b of recognized image 40c, the search line L2 is set as follows based on the characteristic points J and K and reference dimensions R4, R5, and R6 set to have a predetermine length in advance. As illustrated in FIG. 12(b), the points separated to the characteristic point K side only by each of the reference dimensions R4 and R5 from the characteristic point J in a line segment JK which links the characteristic points J and K, are respectively set to be auxiliary points F and H. In addition, in a straight line in the second direction orthogonal to the line segment JK from each of the auxiliary points F and H, the search line L2 in which a point separated only by the reference dimension R6 in the inner direction (lower direction in the drawing) of installed portion 15b from the auxiliary point F is set to be a search start position S2, and a point separated only by the reference dimension R6 from the auxiliary point H is set to be a search finish position G2, is set.

In the height measurement based on recognized image 40c illustrated in FIG. 11, the searching for detecting the brightness along the search lines L1 and L2 which are set in this manner is performed. First, in the searching for detecting the brightness along the search line L1 set on the upper surface of connector 13, an intersection between the search line L1 and slit light 53b is detected as a detected point P1 which is brighter than other positions.

In addition, based on the position in the first direction of the detected point P1, the height is acquired at the detected point P1 of the upper surface of connector 13. In the height detection, for example, by acquiring a position shift amount Db between the detected point P1 and slit light 53a illustrating slit light 53 on the upper surface of electronic device 4, it is possible to acquire the relative height of the upper surface of connector 13 with respect to the upper surface of electronic device 4. In addition, it is possible to set terminal surface 13c which is the nearest to the installation part of installed portion 15b as the measurement target part, and it is also possible to set the search line L1 on terminal surface 13c. However, terminal surface 13c is not preferable as the measurement target part since the terminal row is provided on terminal surface 13c and an unevenness degree is large, and thus, the upper surface of a main body of connector 13 is set to be the measurement target part in the exemplary embodiment.

Next, in the searching for detecting the brightness along the search line L2 set on the upper surface of installed portion 15b, an intersection between the search line L2 and slit light 53f is detected as a detected point P2 which is brighter than the other positions. In addition, based on the position in the first direction of the detected point P2, the height of the upper surface in the vicinity of the tip end portion of installed portion 15b is acquired. For example, by acquiring a position shift amount Df between the detected point P2 and slit light 53e illustrating slit light 53 on the upper surface of electronic device 4, it is possible to acquire the relative height of the upper surface of installed portion 15b with respect to the upper surface of electronic device 4.

The above-described processing illustrates processing in the second image recognition step executed by height recognizer 62. Here, based on the positions of the characteristic points (characteristic points A, B, J, and K) of cable 15 and connector 13 which are obtained in the first image recognition process executed by image recognizer 61, the search lines L1 and L2 are set. In addition, by searching for the brightness along the set search lines L1 and L2, the detection locations (here, the detected point P1 in slit light 53b, and the detected point P2 in slit light 53f) of slit light 53 included in recognized image 40c are narrowed down.

In addition, in the above-described example, an example in which each of the individual heights with respect to the upper surface of electronic device 4 is acquired in the height measurement for measuring the heights of installed portion 15b of cable 15 and connector 13, is illustrated. However, the relative height of installed portion 15b with respect to connector 13 may be directly acquired. An object of the height measurement is to acquire a position shift correction amount in the height direction when installing installed portion 15b on connector 13. Therefore, by acquiring the position shift amount in the first direction between slit light 53b and slit light 53f in recognized image 40c, it is possible to directly acquire the relative height of installed portion 15b with respect to connector 13.

In this manner, the first position detection step and the second position detection step are executed, and the positions in the two-dimensional plane direction and the positions in the height direction between installed portion 15b of cable 15 and connector 13 are detected. In addition, based on the detection results in the first position detection step and the second position detection step, by controlling robot section 5 by controller 60, cable holding tool 20 is moved and installed portion 15b of cable 15 is installed on connector 13 (connector installing step).

In the connector installing process, cable holding tool 20 which holds cable 15 is positioned such that the representative points M1 and M2 (refer to recognized image 40b illustrated in FIG. 10) of each of connector 13 and installed portion 15b are disposed at appropriate positions, and further, such that installed portion 15b has an appropriate height with respect to installer 13b of connector 13. In addition, as illustrated in FIG. 13(a), cable holding tool 20 is moved (arrow g), and installed portion 15b of cable 15 is inserted from several diagonal directions into installer 13b of connector 13 of electronic device 4. At this time, swing section 13a is in an open standing state, and the insertion of installed portion 15b is not interrupted.

Next, as illustrated in FIG. 13(b), the posture of cable holding tool 20 is adjusted (arrow h), and a wiring pattern formed in installed portion 15b comes into contact with terminal surface 13c (refer to FIG. 9(a)) of connector 13 by placing installed portion 15b in a horizontal posture. In this manner, after installing cable 15 in connector 13, an operation for making the locked state of cable 15 efficient in connector 13 is performed.

In other words, as illustrated in FIG. 13(c), connector lock tool 30 approaches connector 13 which is the target of the lock operation (arrow i). In addition, roller 31 of connector lock tool 30 abuts against and is pushed to swing section 13a in a standing state diagonally from above, and swing section 13a is pushed down by an elastic force of the buffer 32. Accordingly, as illustrated in FIG. 13(d), installed portion 15b installed in installer 13b of connector 13 is pushed in by swing section 13a, and cable 15 is prevented from dropping out from connector 13.

In addition, in the above-described first exemplary embodiment illustrated in FIG. 11, an example in which the search line L2 is set only at one location in installed portion 15b which serves as the measurement target part, is illustrated. However, according to a deformation state of installed portion 15b, the search lines may be set at a plurality of locations of installed portion 15b. For example, in the second exemplary embodiment illustrated in FIG. 14, an example in which the search lines L2 and L3 at two locations are set at positions different from each other in the second direction that is the installing direction of cable 15 in installed portion 15b, is illustrated.

In addition, in the second image recognition step in the second position detection step, by searching for the brightness along the search lines L2 and L3 in recognized image 40c, the detected points P2 and P3 which are intersections with slit light 53f are detected. At this time, in a case where three-dimensional deformation in the second direction, such as a case where the tip end portion of installed portion 15b hangs down, is generated, the positions in the first direction of the detected points P2 and P3 are different from each other in accordance with the height at the position.

For example, in the example illustrated here, the position shifts in the first direction between slit light 53e and the detected points P2 and P3 which correspond to the upper surface of electronic device 4, are respectively the position shift amount Df (2) and the position shift amount Df (3) which is greater than the position shift amount Df (3). Accordingly, it is detected that installed portion 15b has a shape in which the detected point P2 which is close to the tip end portion is deformed and hangs down to a part lower than the detected point P3.

In other words, in the second exemplary embodiment, in the second image recognition step by height recognizer 62, slit light 53f is detected at least at a plurality of locations of the surface of cable 15, and the heights thereof are recognized. Here, at a desirable position other than the surface of cable 15, the slit light may be detected and the height may be detected.

Figure 15:
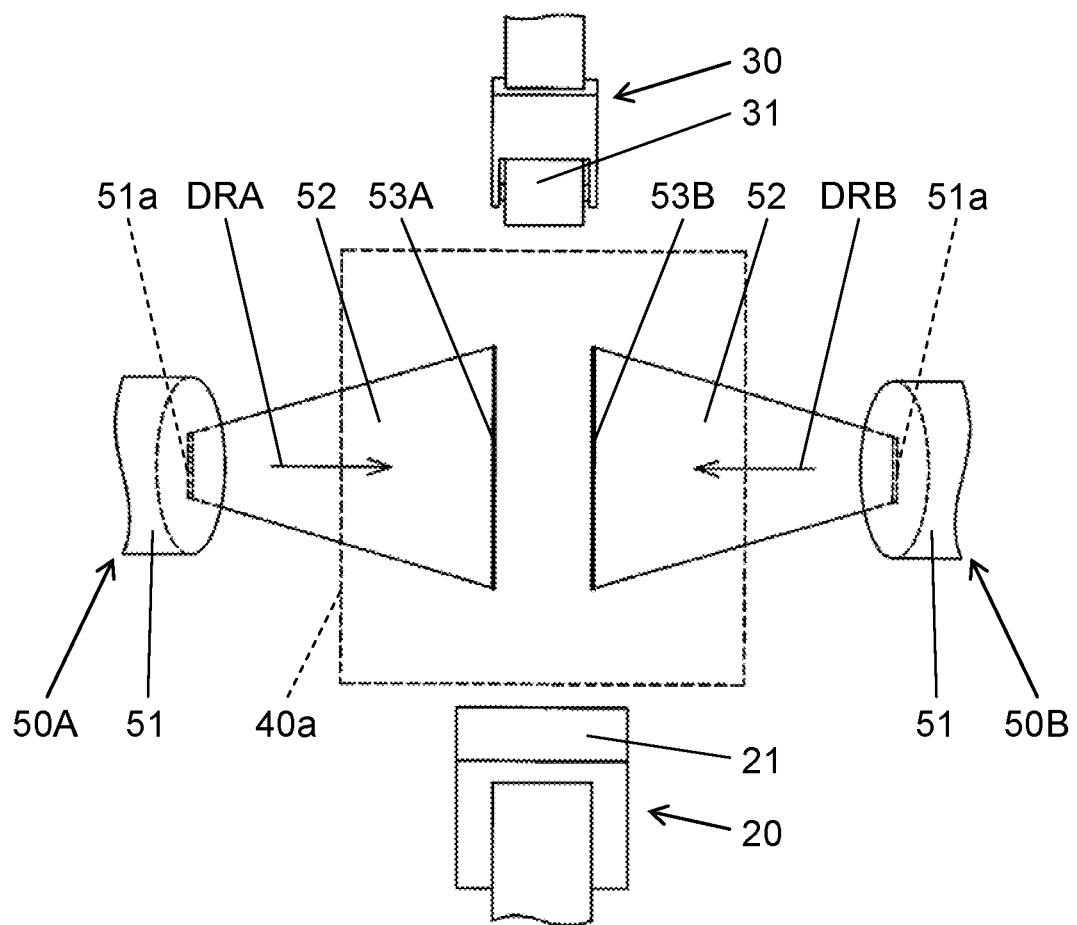
FIG. 15 is a view illustrating the projection state of light for height measurement in the position recognition of the connector and the cable by electronic device manufacturing apparatus of the exemplary embodiment.
Figure 16:
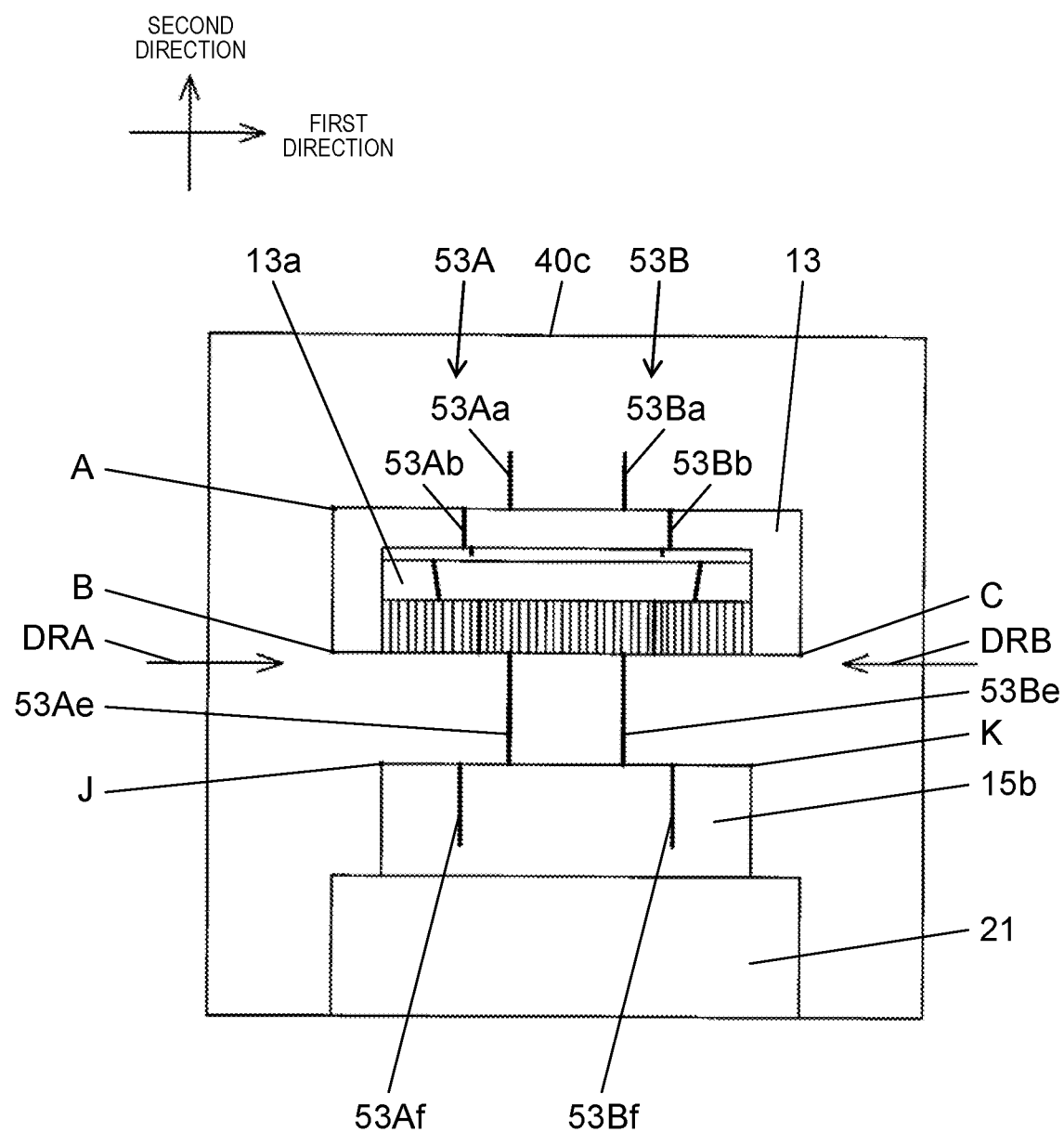
FIG. 16 is a view illustrating the height measurement in the position recognition of the connector and the cable by electronic device manufacturing apparatus of the exemplary embodiment.

In addition, FIGS. 15 and 16 illustrate an example (third exemplary embodiment) in which a plurality of projectors that configure the second position detector are provided. As illustrated in FIG. 15, at a position orthogonal to an opposing line on which cable holding tool 20 and connector lock tool 30 oppose each other in base section 8, two projectors 50A and 50B are disposed to oppose each other. The projectors 50A and 50B have light emitter 51 in which the slit holes 51a for irradiating any tip end surface with the slit light are provided.

By operating the projectors 50A and 50B, from the slit holes 51a of each of the light emitters 51, slit light 52 similar to slit light 52 illustrated in FIG. 6 is projected to cable 15 and connector 13 which are at a position sandwiched between cable holding tool 20 and connector lock tool 30 from projection directions DRA and DRB which oppose each other. Cable 15 and connector 13 are positioned in imaging visual field 40a of imager 40. Therefore, by performing the imaging by using imager 40 in a state where the projectors 50A and 50B are operated, the image (second image) of cable 15 and connector 13 which are irradiated with the light for the height measurement, is obtained. In the second image, slit light 53A and 53B which are expressed on the screen as slit light 52 with which cable 15 and connector 13 are irradiated is reflected and which is received by camera 43 of imager 40, are included.

FIG. 16 illustrates recognized image 40c including slit light 53A and 53B which are expressed on the image as slit light 52 emitted in this manner is reflected. In the third exemplary embodiment, by the recognition processing function of height recognizer 62 in recognized image 40c, the heights of installed portion 15b of cable 15 and connector 13 are recognized.

In the third exemplary embodiment, by projecting slit light 52 individually by each of the plurality of projectors 50A and 50B to connector 13 and installed portion 15b, slit light 53A and 53B are obtained at two positions in the first direction of recognized image 40c. In addition, in each of slit light 53A and 53B, similar to a case where slit light 53 illustrated in FIG. 11 is a target, the heights of installed portion 15b and connector 13 are individually measured.

In recognized image 40c, since the projection directions DRA and DRB are directions that oppose each other, the position shift direction in the first direction due to a height difference by slit light 53A and 53B is expressed to be different. In other words, in slit light 53A, slit light 53A is expressed to be deviated to the left side as the height increases, and in slit light 53B, slit light 53B is expressed to be deviated to the right side as the height increases.

In addition, in the third exemplary embodiment, by the positions in the first direction of slit light 53Ab and 53Af, heights of installed portion 15b and connector 13 are acquired at the position of slit light 53A. In addition, the heights of installed portion 15b and connector 13 are acquired at the position of slit light 53B by the position in the first direction of slit light 53Bb and 53Bf. In other words, in the third exemplary embodiment, it is possible to acquire the heights of installed portion 15b and connector 13 at two positions different from each other in the first direction.

Figure 17:
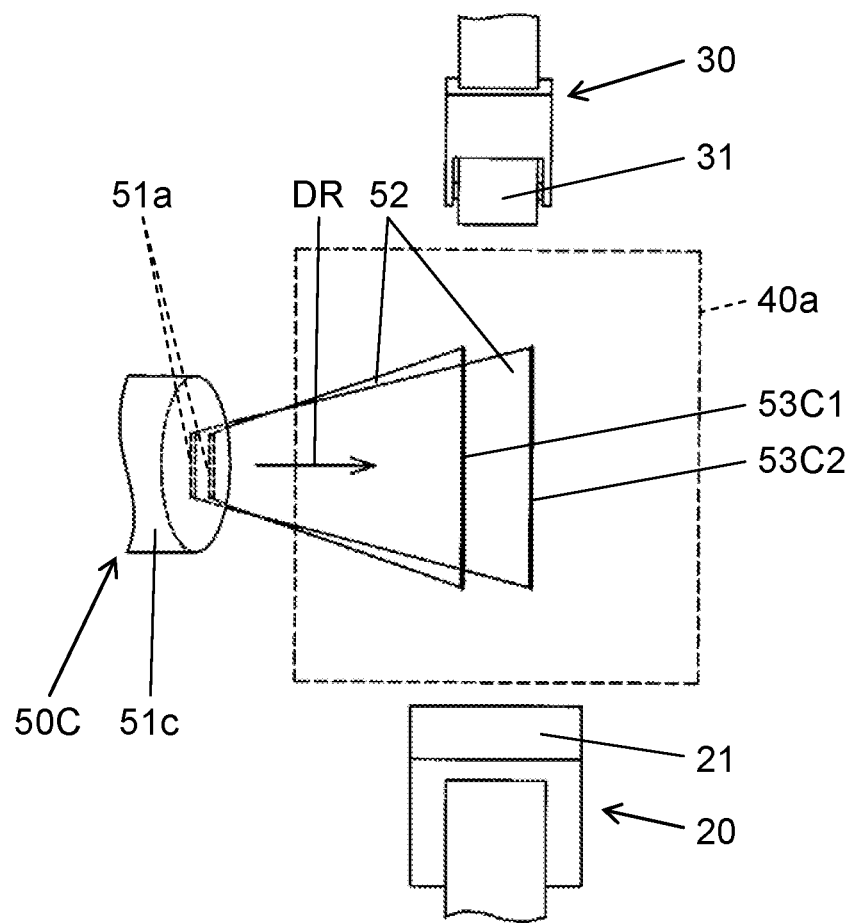
FIG. 17 is a view illustrating the projection state of light for height measurement in the position recognition of the connector and the cable by electronic device manufacturing apparatus of the exemplary embodiment.
Figure 18:
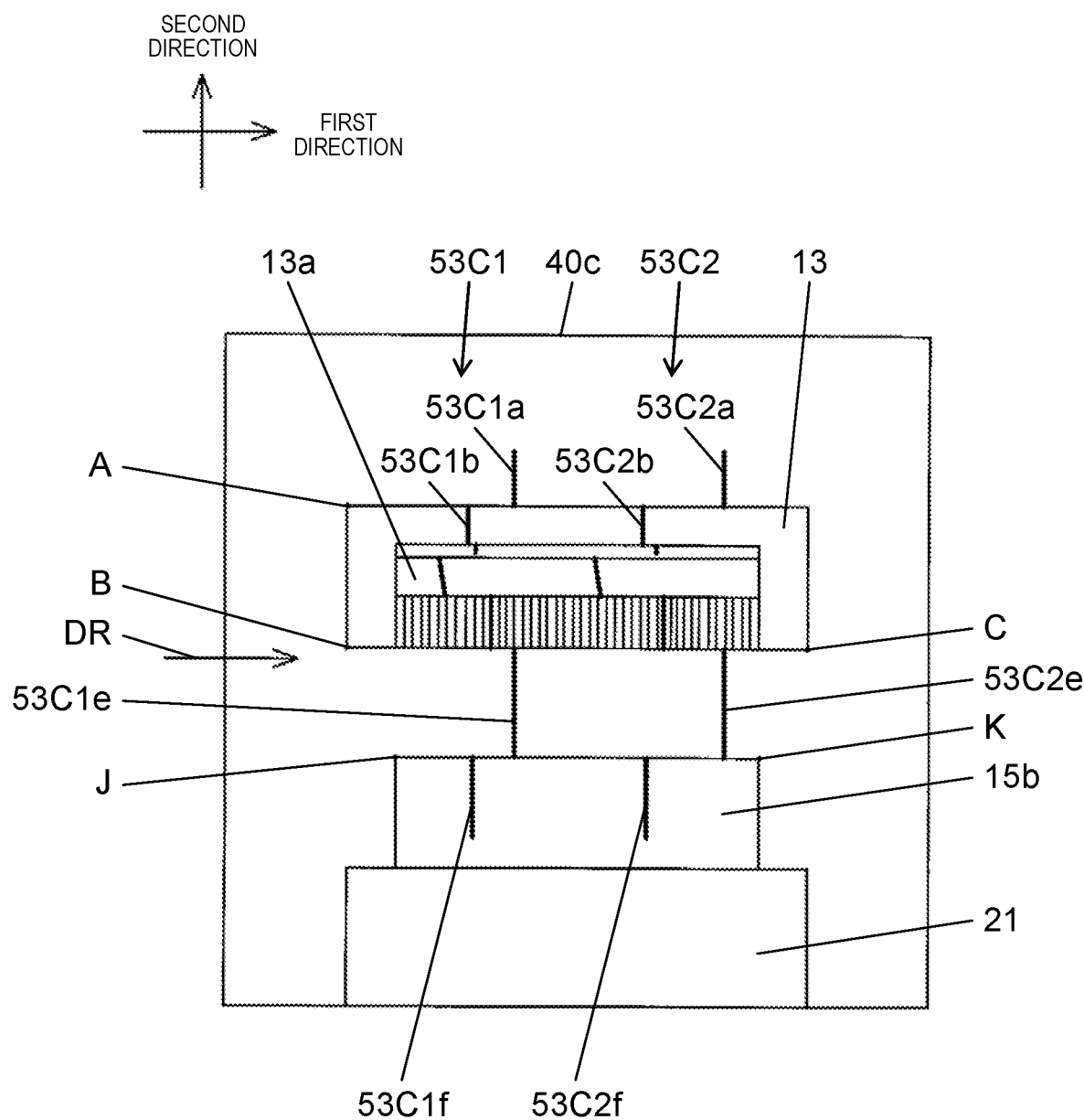
FIG. 18 is a view illustrating the height measurement in the position recognition of the connector and the cable by electronic device manufacturing apparatus of the exemplary embodiment.

Furthermore, FIGS. 17 and 18 illustrate an example (fourth exemplary embodiment) in which a projector 50C including a light emitter 51c including the plurality of slit holes 51a is used, as the projector that configures the second position detector. As illustrated in FIG. 17, at the position orthogonal to the opposing line on which cable holding tool 20 and connector lock tool 30 oppose each other in base section 8, projector 50C is disposed. Projector 50C includes light emitter 51c provided with the plurality of slit holes 51a for irradiating the tip end surface with the slit light.

By operating projector 50C, slit light 52 similar to slit light 52 illustrated in FIG. 6 from each of the slit holes 51a is projected to cable 15 and connector 13 which are at a position sandwiched between cable holding tool 20 and connector lock tool 30 from the same light projection direction DR. Cable 15 and connector 13 are positioned in imaging visual field 40a of imager 40, the imaging is performed by using imager 40 in a state where projector 50C is operated, and accordingly, the image (second image) of cable 15 and connector 13 which are irradiated with the light for the height measurement, is obtained. In the second image, slit light rays 53C1 and 53C2 which are expressed on the screen as the plurality (here, two) of rays of slit light 52 with which cable 15 and connector 13 are irradiated are reflected and which are received by camera 43 of imager 40, are included.

FIG. 18 illustrates recognized image 40c including slit light 53C1 and 53C2 which are expressed on the screen as the two rays of slit light 52 emitted in this manner are reflected. In the fourth exemplary embodiment, by the recognition processing function of height recognizer 62 in recognized image 40c, the heights of installed portion 15b of cable 15 and connector 13 are recognized.

In the fourth exemplary embodiment, by projecting the two rays of slit light 52 by projector 50C including the two slit holes 51a to connector 13 and installed portion 15b, slit light 53C1 and 53C2 are obtained at two positions in the first direction of recognized image 40c. In addition, in each ray of slit light 53C1 and 53C2, similar to a case where slit light 53 illustrated in FIG. 11 is a target, the heights of installed portion 15b and connector 13 are individually measured.

In recognized image 40c, since slit light 52 is projected in the same light projection direction DR from the two slit holes 51a, with respect to any of slit light 53C1 and 53C2, the position shift directions in the first direction by the height difference become the same direction. In other words, in any of slit light 53C1 and 53C2, slit light 53C1 and 53C2 are expressed to be deviated to the left side as the height increases. In addition, in a case where the two rays of slit light 52 are projected from the light projection direction DR having the same inclination angle θ, conversion rates between the position shift amount in the first direction and the practical height difference in recognized image 40c, are also the same with respect to any of slit light 53C1 and 53C2. Meanwhile, in a case where the two rays of slit light 52 are projected from the light projection direction DR having different inclination angle θ, the above-described conversion rate varies depending on the inclination angle θ.

In addition, in the fourth exemplary embodiment, similar to the above-described example, by the positions in the first direction of slit light 53C1b and slit light 53C1f, the heights of installed portion 15b and connector 13 at the position of slit light 53C1 are acquired. In addition, the heights of installed portion 15b and connector 13 at the position of slit light 53C2 rather than the positions in the first direction of slit light 53C2b and slit light 53C2f, are acquired. In other words, in the fourth exemplary embodiment, it is possible to acquire the heights of installed portion 15b and connector 13 at two positions different from each other in the first direction.

In other words, in the above-described third exemplary embodiment and the fourth exemplary embodiment, in the measurement light irradiation step in the second position detection step for detecting the positions in the height direction of connector 13 and installed portion 15b of the temporarily positioned cable 15, the plurality (here, two in the example) of rays of slit light 52 are emitted. Therefore, as described above, it is possible to acquire the heights of installed portion 15b and connector 13 at two positions different from each other in the first direction. Accordingly, in the connector installation operation for installing installed portion 15b on connector 13, a position correction operation which considers a height relationship in the first direction, for example, torsional deflection of installed portion 15b, in addition to a height relationship in the second direction between connector 13 and installed portion 15b, is possible.

As described above, in the electronic device manufacturing method by electronic device manufacturing apparatus 1 illustrated in the exemplary embodiment, a configuration in which cable holding tool 20 which holds cable 15 is moved and is installed on connector 13 when performing the connector installation work for installing belt-shaped cable 15 on connector 13 of the electronic device held by the work stage, is employed. In addition, from the first image obtained by taking an image of cable 15 held by cable holding tool 20 and connector 13 of the electronic device, the positions (positions when viewed from above) in the two-dimensional plane direction of cable 15 and connector 13 are detected. Furthermore, from the second image obtained by taking an image of the state where the slit light is projected by projector 50 to cable 15 held by cable holding tool 20 and connector 13, the positions (position in the direction which is substantially orthogonal to the position in the two-dimensional direction) in the height direction of cable 15 and connector 13 are detected. In addition, the installation operation of cable 15 on connector 13 is controlled based on the detection results.

Accordingly, when positioning cable 15 and connector 13, it is possible to perform the correction not only in the two-dimensional plane direction but also including the position error in the height direction. Therefore, in a case where cable 15 which is likely to be bent and has the position error in the height direction with connector 13 at a final end, it is also possible to automate the connection work by equipment having a simple configuration.

According to the disclosure, it is possible to automate the connection work of the cable which is likely to be bent and has the position error in the height direction with the connector at the final end by the equipment having a simple configuration.

An electronic device manufacturing apparatus and an electronic device manufacturing method of the disclosure have an effect that it is possible to automate connection work of a cable which is likely to be bent and has a position error in a height direction with a connector at a final end by equipment having a simple configuration. Therefore, the electronic device manufacturing apparatus and the electronic device manufacturing method of the disclosure are useful in a work field in which the electronic device is manufactured by installing the belt-shaped cable on the connector.

What is claimed is:

1. An electronic device manufacturing apparatus for installing a cable on a connector that configures a part of an electronic circuit, comprising:
   a cable holding tool which holds the cable;
   a robot section which relatively moves the cable holding tool with respect to the electronic device including the connector;
   a base section which moves together with the cable holding tool by the robot section;
   a first position detector which detects positions in a two-dimensional plane direction of the cable held by the cable holding tool and of the connector of the electronic device;
   a second position detector which detects positions in a height direction of the cable held by the cable holding tool and of the connector of the electronic device;
   a single imager configured to provide images for the first and second position detectors;
   a controller which controls the robot section based on one or more images taken by the imager and on the detection result of each of the first position detector and the second position detector; and
   a projector which projects light for height measurement to the cable held by the cable holding tool and the connector of the electronic device,
   wherein the imager and the projector are attached to the base section, and
   wherein the imager is configured to take a first image of the cable and the connector positioned in an imaging field of the first position detector and a second image of the cable and the connector positioned in an imaging field of the second position detector.

2. The electronic device manufacturing apparatus of claim 1, wherein the first position detector includes:
   the imager which takes the first image of the cable held by the cable holding tool and of the connector of the electronic device; and
   an image recognizer which recognizes the positions of the cable and the connector by the first image taken by the imager.

3. The electronic device manufacturing apparatus of claim 2,
   wherein the second position detector includes
   the imager, and
   a height recognizer which recognizes heights of the cable and the connector by the second image of the cable and the connector, which are irradiated with the light for height measurement, taken by the imager.

4. The electronic device manufacturing apparatus of claim 3,
   wherein the light for height measurement which is projected from the projector is only a single slit-shaped slit light.

5. The electronic device manufacturing apparatus of claim 4,
   wherein the slit light reflected by surfaces of the cable and the connector is included in the second image, and the height recognizer narrows down a detection location of the slit light included in the second image based on positions of characteristic points of the cable and the connector which is obtained by the image recognizer.

6. The electronic device manufacturing apparatus of claim 4, wherein the slit light reflected by surfaces of the cable and the connector is included in the second image, and the height recognizer recognizes the heights by detecting the slit light at least at a plurality of locations of the surface of the cable.

7. The electronic device manufacturing apparatus of claim 4, wherein the second position detector further includes one or more additional projectors each for emitting a single slit-shaped slit light.

8. The electronic device manufacturing apparatus of claim 3, wherein the projector is one of a plurality of projectors, each for emitting a single slit-shaped slit light.

9. The electronic device manufacturing apparatus of claim 3, further comprising:
a base section which moves together with the cable holding tool by the robot section,
wherein the imager and the projector are attached to the base section.

10. The electronic device manufacturing apparatus of claim 1, wherein the imager is a camera.

11. The electronic device manufacturing apparatus of claim 1, further including a work stage that holds the electronic device, wherein the cable holding tool can be advanced towards the work stage relative to the base section.

12. The electronic device manufacturing apparatus of claim 1, further including a work stage that holds the electronic device, wherein the cable holding tool can be advanced towards the work stage relative to the imager.

13. An electronic device manufacturing method for installing a cable on a connector that configures a part of an electronic circuit, the method comprising:
a cable holding step of holding the cable by a cable holding tool;
a temporary positioning step of temporarily positioning the cable held by the cable holding tool with respect to the connector by moving a base section which moves together with the cable holding tool;
a first position detecting step of detecting positions in a two-dimensional plane direction of the connector and the temporarily positioned cable;
a second position detecting step of detecting positions in a height direction of the connector and of the temporarily positioned cable;
a connector installing step of installing the cable on the connector by moving the cable holding tool based on the detection result of the first position detecting step and the second position detecting step; and
wherein the first and second position detecting steps include imaging the connector and the cable using a single imager, wherein the imager takes a first image of the cable and the connector position in an imaging field of the first position detector and a second image of the cable and the connector position in an imaging field of the second position detector.

14. The electronic device manufacturing method of claim 13,
wherein the first position detecting step includes
a first imaging step of taking a first image of the cable held by the cable holding tool and of the connector of the electronic device, and
a first image recognizing step of recognizing the positions of the cable and the connector by the first image taken in the first imaging step.

15. The electronic device manufacturing method of claim 13,
wherein the second position detecting step further includes
a second imaging step of taking an image of the cable and the connector which are irradiated with the light for height measurement, and
a second image recognizing step of recognizing heights of the cable and the connector by a second image taken in the second imaging step.

16. The electronic device manufacturing method of claim 15,
wherein the light for height measurement in the measurement light irradiating step is only a single slit-shaped slit light, and
wherein the slit light reflected by surfaces of the cable and the connector is included in the second image, and in the second image recognizing step, a detection location of the slit light included in the second image is narrowed down based on positions of characteristic points of the cable and the connector which is obtained in the first image recognizing step.

17. The electronic device manufacturing method of claim 15,
wherein the light for height measurement in the measurement light irradiating step is only a single slit-shaped slit light, and
wherein the slit light reflected by surfaces of the cable and the connector is included in the second image, and in the second image recognizing step, the slit light is detected at least at a plurality of locations of the surface of the cable, and the height is recognized.

18. The electronic device manufacturing method of claim 13,
wherein the light projected at the measurement light irradiating step also is projected from one or more additional projectors, and
wherein the light from each of the projector and the one or more additional projectors is a single slit-shaped slit light, thus providing a plurality of rays of slit light emitted.

19. The electronic device manufacturing method of claim 13, wherein the imager is a camera.

20. The electronic device manufacturing method of claim 13, wherein the temporary positioning step includes moving together a base section, the cable holding tool, the imager, and the projector, wherein the cable holding tool, the imager, and the projector are attached on the base section, and
further including advancing the cable holding tool towards a work stage that holds the electronic device relative to the imager.

* * * * *